US008671006B2

(12) United States Patent
Zyskowski et al.

(10) Patent No.: US 8,671,006 B2
(45) Date of Patent: Mar. 11, 2014

(54) SYSTEM AND METHOD FOR MANAGING AND PREDICTING CROP PERFORMANCE

(75) Inventors: Robert Francis Zyskowski, Christchurch (NZ); Peter Douglas Jamieson, Christchurch (NZ)

(73) Assignee: New Zealand Institute for Plant and Food Research Limited, Lincoln (NZ)

( * ) Notice: Subject to any disclaimer, the term of this patent is extended or adjusted under 35 U.S.C. 154(b) by 431 days.

(21) Appl. No.: 12/682,227

(22) PCT Filed: Oct. 9, 2008

(86) PCT No.: PCT/NZ2008/000263
§ 371 (c)(1),
(2), (4) Date: Jul. 7, 2010

(87) PCT Pub. No.: WO2009/048341
PCT Pub. Date: Apr. 16, 2009

(65) Prior Publication Data
US 2010/0306012 A1    Dec. 2, 2010

(30) Foreign Application Priority Data

Oct. 9, 2007   (NZ) .................................... 562316

(51) Int. Cl.
*G06Q 10/00* (2012.01)
*A01H 1/00* (2006.01)
*C12N 1/20* (2006.01)

(52) U.S. Cl.
USPC ....... 705/7.12; 705/7.11; 705/7.13; 705/7.25; 800/260; 435/252.2

(58) Field of Classification Search
USPC .............. 705/7.11–7.42; 800/260; 435/252.2
See application file for complete search history.

(56) References Cited

U.S. PATENT DOCUMENTS 4,570,378 A  *  2/1986  Wendt et al. ..................... 47/9
4,755,942 A      7/1988  Gardner et al.

(Continued)

FOREIGN PATENT DOCUMENTS

EP       0202847 A2    11/1986
WO   2007/129295 A1   11/2007

OTHER PUBLICATIONS

Mulvaney, R. L., et al., "Needs for a Soil-Based Approach in Managing Nitrogen Fertilizers for Profitable Corn Production", Soil Science Society of America Journal, Jan./Feb. 2006, vol. 70, Issue 1, pp. 172-182.*

(Continued)

*Primary Examiner* — Justin M Pats
*Assistant Examiner* — Amber A Misiaszek
(74) *Attorney, Agent, or Firm* — Sughrue Mion, PLLC

(57) ABSTRACT

The invention provides a method of managing fertilizer and irrigation inputs for a crop, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen deficit values at least partly from the emergence date and the soil description data, the nitrogen deficit values associated with respective dates each later than the emergence date; calculating a plurality of water deficit values at least partly from the emergence date and the weather data, the water deficit values associated with respective dates each later than the emergence date; and presenting on a display a schedule of recommended nitrogen application values, irrigation values and application dates, the schedule calculated at least partly from the nitrogen deficit values and the water deficit values.

64 Claims, 18 Drawing Sheets

(56) References Cited

U.S. PATENT DOCUMENTS

| | | | |
|---|---|---|---|
| 5,130,925 A * | 7/1992 | Janes et al. | 702/2 |
| 5,884,224 A * | 3/1999 | McNabb et al. | 702/2 |
| 2006/0282295 A1* | 12/2006 | McComb et al. | 705/4 |
| 2007/0260400 A1* | 11/2007 | Morag et al. | 702/1 |
| 2008/0148432 A1* | 6/2008 | Abad | 800/279 |

OTHER PUBLICATIONS

F.Y. Li et al., "The Crop Calculators—from Stimulation Models to Usable Decision-Support Tools." In Oxley, L. and Kulasiri, D. (eds) MODISM 2007 International Congress on Modelling and Simulation. Modelling and Simulation Society of Australia and New Zealand, Dec. 2007, pp. 128-134. Also retrievable online from the internet. <URL:http://mssanz.org.au/MODSIM07/papers/2_s44/TheCropCalculator_s44_Li_F.Y._.pdf>.

P.D. Jamieson et al., "On-farm testing of the Sirius Wheat Calculator for N fertilizer and irrigation management", Proceedings of the 11th Australian Agronomy, pp. 1-3. Retrieved on Jan. 2, 2009 from the Internet. <URL:http://www.regional.org.au/au/asa/2003/c/2/jamieson.htm>.

T. Armour et al, (2002), "Testing the Sirius wheat calculator", Proceedings Agronomy Society of New Zealand, vol. 32, pp. 1-6.

T. Armour et al., (2004), "Using the Sirius wheat calculator to manage wheat quality—the Canterbury experience", Agronomy New Zealand, vol. 34, pp. 171-176.

Computer-based decision support tools for Australian farmers. Retrieved from internet. Published on Sep. 8, 2007 as per Wayback engine pp. 1-4. <URL:http://web.archive.org/web/20070908135013/http://cropscience.org.au/icsc2004/poster/4/1/1/691_moore.htm>.

"Wheat Calculator—a tool to optimize wheat production", CEREALS, No. 166, Aug. 2005: Retrieved on Dec. 23, 2008 from the internet. <URL:http://www.maf.govt.nz/sff/about-projects/search/02-010/wheat-calculator.pdf>.

\* cited by examiner

SYSTEM AND METHOD FOR MANAGING AND PREDICTING CROP PERFORMANCE

FIELD OF INVENTION

The present invention relates to an integrated system and method for managing and monitoring crops that facilitates reductions in costs and environmental impacts by optimizing the amount and the timing of irrigation and nitrogen fertiliser applications, while maintaining or improving yield of the crop.

BACKGROUND TO INVENTION

Most soils are unable to supply the amount of nitrogen required to maximise crop yields; nitrogen in the form of fertiliser is added to make up the shortfall. One difficulty that farmers face is how to determine the size and timing of this shortfall and subsequently determine how much and when nitrogen fertiliser should be applied.

Fertiliser decision support systems attempt to address this problem. These systems seek to recommend a schedule of nitrogen fertiliser in the correct timings and amounts to avoid both yield limiting deficits and costly surpluses.

Crops are also sensitive to water deficits. In some climates, summer evapotranspiration substantially exceeds precipitation. In such climates, irrigation is essential to reach yield potentials.

A number of high-value commercial food crops, including but not limited to potatoes, maize and wheat, produce yields that are highly responsive to both irrigation and nitrogen. This has caused a culture of over-irrigating and over-fertilising to ensure valuable yield is not lost due to deficits. This practice wastes fresh water and nitrogen, causes problems with stream and ground water quality, and represents an unnecessary economic cost. In the past farmers have viewed this cost as "insurance" against missing out on potential yield. Rising energy and commodity costs are pushing up the cost of irrigation and fertiliser. At the same time, increasing consumer demand for sustainable production is driving interest and regulation to ensure waste is minimised and the environment is not being damaged.

Currently most farmers irrigate and fertilise according to a recipe based on empirical research (or trial and error) and these recipes often don't provide a very good match with what the crop actually needs.

Current industry standards for scheduling irrigation and nitrogen fertiliser involve monitoring of soil moisture and crop nitrogen status using a variety of techniques. These procedures are reactive, telling the farmer that a crop needs some nitrogen or irrigation today rather than when it will be needed it in the future and how much should be applied. Being able to predict future needs is important because nitrogen can take several days to permeate the soil. If the crop doesn't have enough nitrogen during the period between when it is applied and when it is fully available to the crop, then crop growth will be limited and yield may decline. Predictive methods (such as those used by the invention) are also favourable because they allow forward planning of field operations during the busy growing season.

A number of basic crop and soil models have been published in the literature or are available in the public domain. Crop and soil simulation models use weather data from any location in the world to predict the temperature and solar radiation dependent potential yield and they can predict how much nitrogen and water the soil will provide and how yield will be reduced by water and nitrogen limitations. However, current models do not produce schedules for the application of water and nitrogen that can be easily used by farmers for crop management.

SUMMARY OF THE INVENTION

The present invention has at least three aspects:
1. The production of an irrigation and nitrogen management schedule calendar prescribed to give optimal fertiliser and irrigation management for specified paddocks.
2. The production of predictions of crop yield and development, used for analysing crop yield limitations and monitoring the likely yield and harvest timing of specified paddocks
3. The production of predictions of drainage and leaching, used for analysing resource loss from crops and monitoring their environmental impact Aspect 1 improves upon other nitrogen and irrigation management systems by generating an easily-used schedule for the application of water and nitrogen that takes into account both the current status of the crop and predictions for future crop requirements. Aspect 2 improves upon current methods of analysing and monitoring crop yields because the invention quantifies the effects of interacting weather, soil and management factors to predict yields and identify factors that may be reducing yield. Aspect 3 provides a means of analysis and monitoring that is otherwise not available.

In a first aspect the invention provides a method of managing fertiliser and irrigation inputs for a crop, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen deficit values at least partly from the emergence date and the soil description data, the nitrogen deficit values associated with respective dates each later than the emergence date; calculating a plurality of water deficit values at least partly from the emergence date and the weather data, the water deficit values associated with respective dates each later than the emergence date; and presenting on a display a schedule of recommended nitrogen application values, irrigation values and application dates, the schedule calculated at least partly from the nitrogen deficit values and the water deficit values.

The term 'comprising' as used in this specification and claims means 'consisting at least in part of', that is to say when interpreting statements in this specification and claims which include that term, the features, prefaced by that term in each statement, all need to be present but other features can also be present. Related terms such as 'comprise' and 'comprised' are to be interpreted in similar manner.

As used herein the term "and/or" means "and" or "or", or both.

As used herein "(s)" following a noun means the plural and/or singular forms of the noun.

Preferably the weather data includes at least one of solar radiation, maximum temperatures, minimum temperatures and precipitation.

Preferably the weather data includes wind run.

Preferably the weather data includes humidity.

Preferably the weather data includes potential evapotranspiration.

Preferably the weather data comprises a plurality of daily values.

Preferably the soil description data includes at least one of soil texture profiles, soil bulk density profiles, soil hydraulic properties by depth, soil organic N content, mineralization coefficient, soil mineral N, and distribution of N within the first meter of soil.

Preferably the emergence date is calculated at least partly from a user input emergence date.

Preferably the management data includes cultivar type.

Preferably the emergence date is calculated at least partly from cultivar type.

Preferably the management data includes nitrogen management constraints.

Preferably the management data includes water management constraints.

Preferably the management data includes actual management to date.

Preferably the emergence date is calculated at least partly from the soil description data.

Preferably the method further comprises calculating a growth commencement date.

Preferably the method further comprises calculating a maximum GAI date.

Preferably the method further comprises calculating a canopy senescence completion date.

The invention further provides a computer readable medium having stored thereon computer executable instructions that when executed on a computing device cause the computing device to perform a method of managing fertiliser and irrigation inputs for a crop, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen deficit values at least partly from the emergence date and the soil description data, the nitrogen deficit values associated with respective dates each later than the emergence date; calculating a plurality of water deficit values at least partly from the emergence date and the weather data, the water deficit values associated with respective dates each later than the emergence date; and presenting on a display a schedule of recommended nitrogen application values, irrigation values and application dates, the schedule calculated at least partly from the nitrogen deficit values and the water deficit values.

In another aspect the invention comprises a method of predicting potential yield for a crop, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen deficit values at least partly from the emergence date and the soil description data, the nitrogen deficit values associated with respective dates each later than the emergence date; calculating a plurality of water deficit values at least partly from the emergence date and the weather data, the water deficit values associated with respective dates each later than the emergence date; and presenting on a display a schedule of potential crop yield values, the schedule calculated at least partly from the nitrogen deficit values and the water deficit values.

The invention further provides a computer readable medium having stored thereon computer executable instructions that when executed on a computing device cause the computing device to perform a method of predicting potential yield for a crop, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen deficit values at least partly from the emergence date and the soil description data, the nitrogen deficit values associated with respective dates each later than the emergence date; calculating a plurality of water deficit values at least partly from the emergence date and the weather data, the water deficit values associated with respective dates each later than the emergence date; and presenting on a display a schedule of potential crop yield values, the schedule calculated at least partly from the nitrogen deficit values and the water deficit values.

In a third aspect the invention comprises a method of predicting potential drainage and leaching from crop production, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen balance values at least partly from the emergence date and the soil description data, the nitrogen balance values associated with respective dates each later than the emergence date; calculating a plurality of water balance values at least partly from the emergence date and the weather data, the water balance values associated with respective dates each later than the emergence date; and presenting on a display a schedule of potential drainage and leaching values, the schedule calculated at least partly from the nitrogen balance values and the water balance values.

The invention further provides a computer readable medium having stored thereon computer executable instructions that when executed on a computing device cause the computing device to perform a method of predicting potential drainage and leaching from crop production, the method comprising obtaining management data for the crop, the management data including a planting date for the crop; obtaining weather data representative of the geographic area of the crop; obtaining soil description data representative of the geographic area of the crop; calculating an emergence date at least partly from the planting date; calculating a plurality of nitrogen balance values at least partly from the emergence date and the soil description data, the nitrogen balance values associated with respective dates each later than the emergence date; calculating a plurality of water balance values at least partly from the emergence date and the weather data, the water balance values associated with respective dates each later than the emergence date; and presenting on a display a schedule of potential drainage and leaching values, the schedule calculated at least partly from the nitrogen balance values and the water balance values.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION

Figure 1:
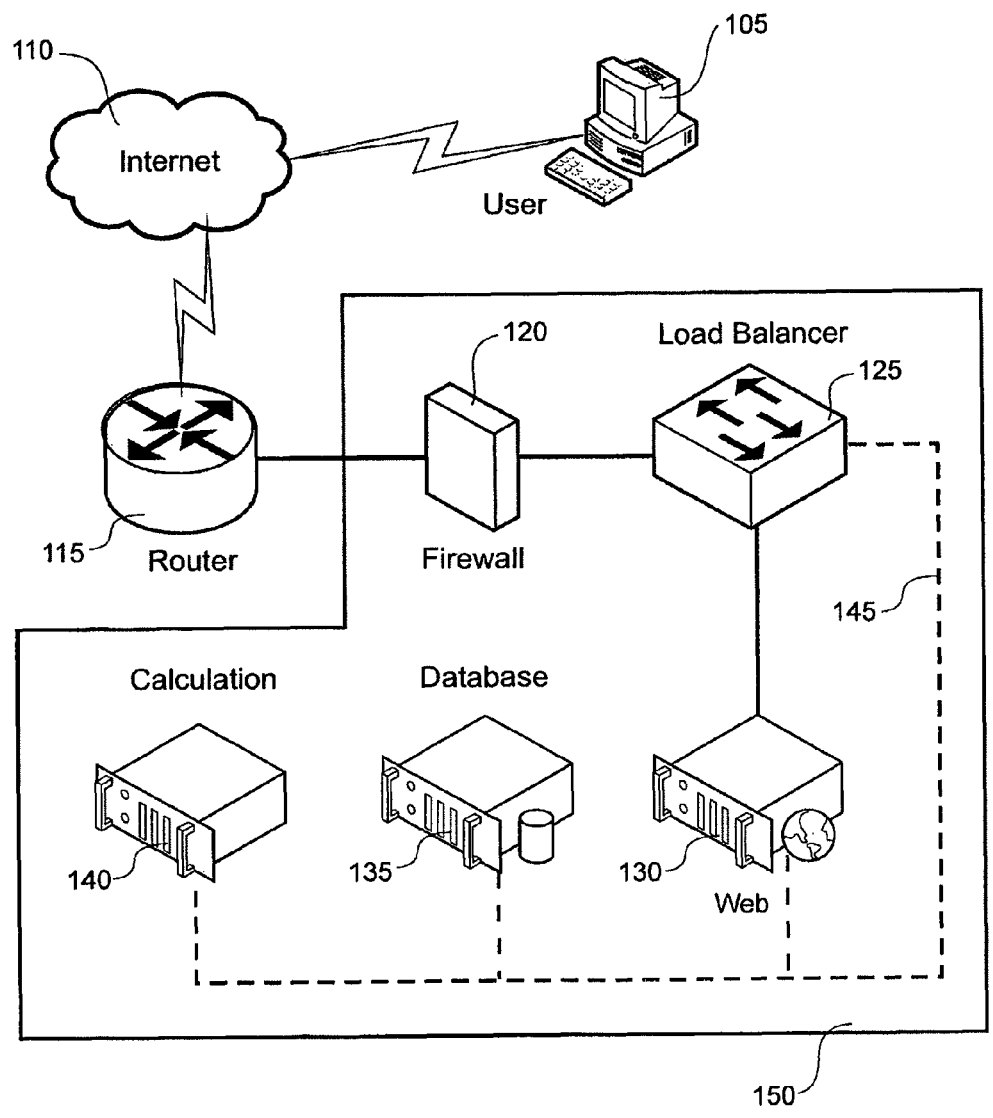
FIG. 1 shows a schematic view of a hardware implementation of the invention.

FIG. 1 shows a preferred form system 100 for managing performance of an agricultural crop. The system 100 enables a user to manage and monitor crops by issuing recommendations of the timing of irrigation and nitrogen fertilizer applications.

The system is primarily a web based application. A user 105 accesses information over internet 110 from a personal computer or other computing device using a web browser. User 105 is provided with a uniform resource locator (URL). The browser running on user machine 105 uses the URL to determine the internet protocol (IP) address of a web page providing information required. An IP request is then sent from user 105 over internet 110 to a router 115. The router is located between the internet 110 and other components of the system 100. The router 115 passes along data packets that are specifically addressed to other components of the system 100. The router 115 filters or redirects packets that are intended for other destinations. Data that are intended for the system described below pass next to a firewall 120. The firewall 120 is an optional but preferred component of system 100. The firewall 120 acts to filter out certain types of potentially malicious data that might impede or otherwise interfere with the operation of the invention. Firewall 120 further serves as an end point for a virtual private network (VPN) connection.

The firewall 120 allows secure access to further components of the system 100 from a remote location for the purpose of maintenance and updates.

Data that are considered acceptable by the firewall 120 (when present) are then passed to load balancer 125. Load balancer 125 is a further optional component 100 that is a preferred component. The load balancer 125 acts to distribute individual data requests among one or more web servers 130. Load balancer 125 has the potential to improve performance, enabling multiple machines working in parallel to process user requests. Spreading the load over multiple web servers 130 improves reliability since the system continues to function as long as at least one web server is still running.

Web server(s) 130 typically comprise both web server hardware and web server software. Data arriving at the web server hardware are read by the operating system and passed to web server software. Web requests, normally using hyper text transport protocol (HTTP), are processed by the web server software and routed to the web application referencing the original URL sent by the browser of the user 105.

The request is processed based on the parameters provided in the HTTP request. A response is generated consisting of hyper text mark up language (HTML), images and related files and data. As part of generating a response web server software typically passes requests to and receives responses from database 135. One preferred form database is a relational database management system (RDBMS). The database stores data in a persistent form and provides facilities for query and update over a network connection.

Web application 130 receives a request to run soil and crop models to generate water and nitrogen schedules. The web application is configured to either run them directly or to request that calculation server 140 performs all the necessary calculations. In this case the database 135 has the potential to be used as an intermediary to handle reliable queuing and delivery of messages between web application and calculation server.

When a message is received by the calculation server 140, the server then runs the soil and crop models using parameters stored in the database 135. Once the model runs are complete, the results are also stored in the database 135.

Dashed lines 145 show preferred form security options. In order to limit security risks, one configuration of system 100 permits certain applications running on server hardware to only be accessible from behind firewall 120 on a maintenance network as indicated by the dashed line 145. For example remote desktop management and database 135 are only accessible that way and cannot be accessed from an IP address that is visible on the public internet. The maintenance network is typically implemented with alternative private IP addresses that are not visible on the external side of the firewall 120 except through a secure VPN connection. Those secondary IP addresses can also use a second network port on the web server hardware. The secondary IP addresses help distribute the network load among more than one port.

The maintenance network is also used when installing new software on the servers and other scenarios where interference of traffic originating from users is not desirable.

Components 150 are able to be configured as separate pieces of hardware or combined to a fewer number of physical machines including a single machine, without loss of functionality. Multiple machines are able to be used to improve performance and reliability. Furthermore, all of the hardware shown at 150 can be configured in multiple units to increase performance and reliability. For example multiple calculation servers can share the model calculation load. Multiple load balancers can be configured to fail over in the event of the failure of one of them.

Figure 2:
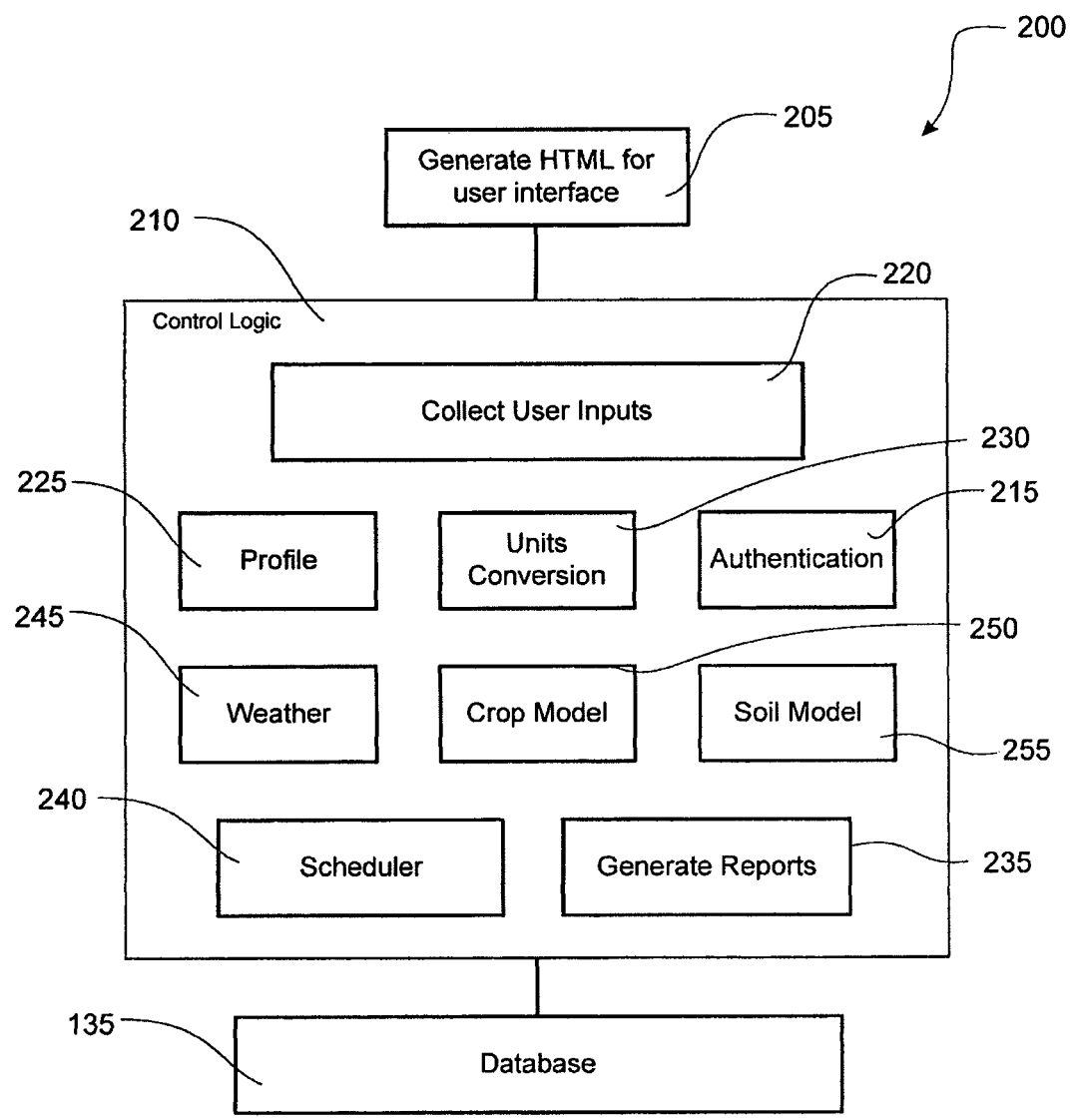
FIG. 2 shows the main software modules of the invention.

FIG. 2 shows further aspects of the system 200 for managing performance of a crop.

System 200 includes a user interface 205 configured to generate HTML. System 200 is also interfaced to the database 135.

System 200 further includes control logic 210. As described above the web application consists of a collection of web pages. Each of these web pages uses some of the control logic 210 to generate HTML.

Access to the system 200 requires a user specific account. An authentication component 215 coordinates the creation of an account after the user provides details including an account name and password. User verification details are stored in the database 135. When a user returns to the system, the user is authenticated by the system after providing the same information.

The web application collects user inputs using module 220. Module 220 uses HTML based forms. Information collected from a user, such as whether they prefer English or metric units, is stored in a user specific profile 225 within database 135. The profile 225 is referenced as part of a page creation process. For example one user preferring English units is provided with an English unit web page while another has the same page displayed to them in metric units.

One preferred component is a units conversion component 230 which converts for example between English and metric units.

Additional user inputs collected by the user input module 220 include descriptions of the location of a farm, the type and depth of soil layers at specific paddocks at that farm, the specific variety of crop planted at each paddock, the date the crop was planted, which weather station most accurately covers their farm, and water and nitrogen history for the crop. The collected information is stored in database 135 and can be displayed and edited by the user.

The scheduler 240 runs the crop 250 and soil 255 models using the collected user inputs 220, and stores the results in the database 135. The user is then able to request generation of reports using a report generation module 235, based on a selected farm, paddock or crop. The report generation module 235 retrieves, formats and displays information stored in the database 135, including results of the scheduler 240 and user inputs 220.

Figure 3:
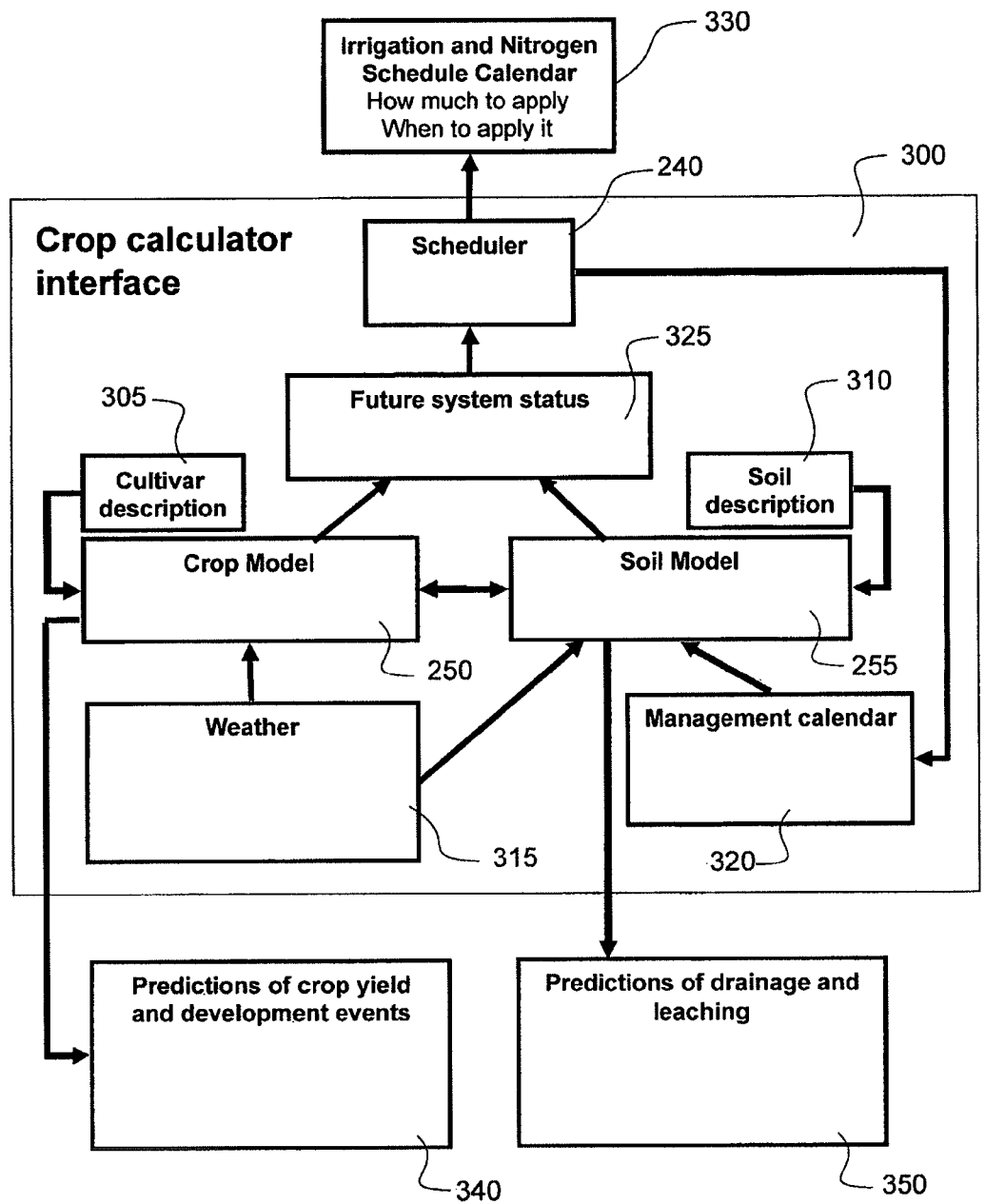
FIG. 3 illustrates a high-level functional block diagram of the invention, including inputs and outputs.

FIG. 3 shows a high level block diagram of the system from FIGS. 1 and 2. The system collates necessary soil and weather data, and other crop and soil model inputs. The system uses this input data to run crop and soil models to produce various outputs. The preferred form crop calculator interface 300 receives information for the user such as a planting date as well as weather, soil and management parameters. User inputs include for example cultivar description 305, soil description 310, weather data 315 and management calendar information 320.

The weather information 315 includes temperature, solar radiation rainfall and potential evapotranspiration. This information includes both past actual data as well as future mean or forecast data. Management calendar information 320 includes irrigation and fertilisation data. This includes for example measured past actual data as well as future scheduled data.

Data 305, 310, 315 and 320 are then input to crop model 250 and soil model 255. Crop model 250 predicts potential crop growth and predicts the resources needed to achieve this growth. Soil model 255 predicts soil water provided and predicts soil nitrogen provided.

Future system status 325 is calculated. This status represents how much a crop needs and how much the soil can provide. The system status predicts when shortfalls in water and/or nitrogen will occur.

Scheduler 240 then determines how much nitrogen and/or water is to be applied and when. The output of this scheduler 240 is then fed into management calendar 320. This modified calendar is then input into soil model 255 and so on to predict when the next shortfall will occur. This process is repeated until no further shortfalls are identified. The resulting schedule calendar 330 can then be followed as a recommendation that will provide sufficient water and nitrogen for a crop to obtain its maximum yield by also avoiding excessive inputs and reducing the risk of wastage.

It is anticipated that this system is used throughout the season to update schedules to account for actual weather (rainfall in particular) that differs from long term averages. This irrigation and nitrogen schedule calendar is indicated at 330.

A further aspect of the invention includes predictions of crop yield and development events 340. A still further aspect includes predictions of drainage and leaching 350.

For the analysis and monitoring of crop yield and development the invention collates user inputs and operates crop and soil models as specified above. In this aspect the outputs from the invention are predictions 340 of yield and harvest timings and the prediction of the extent and timing of yield limitations. These outputs can be used by farmers to determine the cause of low crop yields and may lead to recommendations to improve yield. They can also be used by crop processors to monitor the spread of harvest timings and crop production from a given region for advanced planning of logistics.

For the analysis and monitoring of resource loss the invention collates user inputs and operates crop and soil models as specified above. In this aspect the outputs from the invention are predictions of drainage and leaching 350. These can be used to identify the extent of resource loss from a specified paddock and identify changes in management that may reduce resource waste and create cost savings. These predictions can also be used as a quantification of the environmental impact of the crop's production and may be used for the purpose of environmental audit.

Irrigation and Nitrogen Management

One aspect of the invention involves managing performance of a crop. One aspect of management is the provision of optimal irrigation and nitrogen management recommendations in the form of a schedule. Optimal management of nitrogen and irrigation in crops will provide the crops with just enough of each to meet their demand and achieve maximum yields, but no more than is needed, to minimise wastage. The amount and timing of optimal fertiliser and nitrogen applications will differ depending on the specific weather, soil, planting date, crop variety and paddock history. The difficulty that farmers face is how to determine optimal irrigation and nitrogen management for individual crops that will have different combinations of the above variables. The invention relates to a method for collating soil, weather and management information and interpreting this to prescribe an optimal irrigation and nitrogen schedule forecast specific to the individual paddock.

Figure 4:
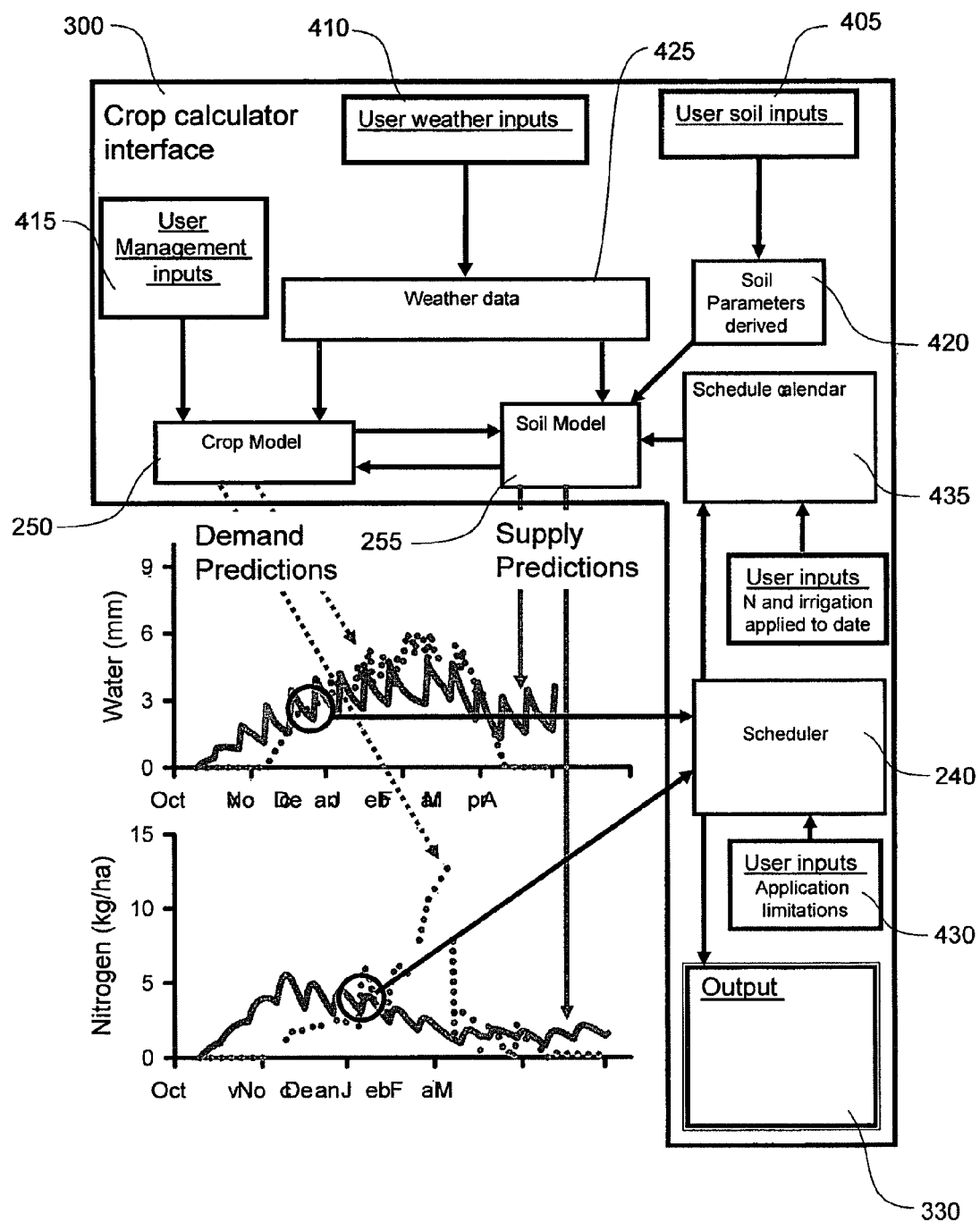
FIG. 4 illustrates the key information exchanges to produce irrigation and management advice.

FIG. 4 shows the crop calculator interface 300 performing the collation and storage of the information specified below. This information is available from a range of sources and reported in a range of units. The invention provides facilities for collating these sources and translating input data into appropriate units for use by the models and schedulers. The input data includes user soil inputs 405, user weather inputs 410 and user management inputs 415.

For user soil inputs 405 the user enters paddock specific test results for:
- a. Soil texture profiles
- b. Soil bulk density profiles (or some surrogate)
- c. Soil mineral nitrogen profiles at or before planting
- d. Top soil nitrogen mineralisation results For user weather inputs 410 the user specifies the nearest weather station from a list of available stations, and the invention collates up-to date actual data and long term average or forecast data from a variety of sources (including the Internet and private weather stations) for that station for:
- a. Temperature (minimum and maximum)
- b. Rainfall
- c. Solar radiation
- d. Potential evapotranspiration For user management inputs 415 the user specifies the management they will impose and have imposed on the crop:
- a. Planting date, row and plant spacing (plant population)
- b. Cultivar (the specific variety of crop to be grown)
- c. Nitrogen management constraints (application rate and timing limitations)
- d. Water management constraints (application rate and timing limitations)
- e. Actual management to date (specified for in-season updates)

The interface 300 collates the above data specific to individual paddocks (or areas within a paddock) and can collect information and perform the functions described below for any number of paddocks that the user chooses to specify. The invention then derives necessary parameters from this information. These parameters include soil parameters 420 and weather data 425. Weather data 425 includes long term average weather and actual past weather. Long term average weather is used as a forecasting. Actual past weather replaces average weather each time the model is updated.

The system then invokes crop model module 250 to predict crop demands. The system runs soil model module 255 to predict soil supply. The system further invokes the scheduler 240 to identify the timing of shortages each time the model is run.

The above modelling procedure identifies when shortages occur. The system starts by running the models using user defined inputs and with no additional irrigation or nitrogen fertiliser. This identifies when shortages first occur. The system then interrogates the user input rules that specify allowable rates of irrigation and nitrogen 430. The scheduler 240 adds the appropriate rate to the appropriate day in a schedule calendar. The schedule calendar 435 displays actual to-date and scheduled future irrigation and fertiliser events.

For nitrogen fertiliser, applications are applied several days (usually 3 days) prior to the occurrence of shortage so there is sufficient time for the fertiliser to be dissolved and become available to the crop by the time the shortage would have otherwise occurred.

For irrigation, applications are made the day before a shortage is predicted, since water becomes available to the crop immediately.

The models are then re-run with the above events appended to the schedule calendar 435 to identify when the next shortage occurs. This procedure is repeated until no further shortage events are identified.

The resulting series of events is a schedule calendar 330 that can be presented to the user as a report, recommending when and how much nitrogen and irrigation is to be applied.

Actual weather will always vary from long term averages or forecasts, which means in reality that shortages may occur sooner or later than is predicted using long-term weather forecasts. Practical considerations also mean actual amounts and timing of nitrogen and irrigation often differ from that recommended by the invention. It is therefore important to update schedules throughout the growing season to ensure that nitrogen and irrigation are matched to the supply and demand that the actual weather produces.

Another important feature of the system is its ability to handle the transition between actual and forecast information. The system automatically updates weather data for each weather station and replaces forecast with actual data as the season progresses. The updated data is obtained from multiple sources, including the Internet and private weather stations. The system also recognises that events in the schedule calendar prior to the date of the update should represent actual events. Thus, it prompts the user to check and change them if actual management differed from that scheduled. It then removes all of the future scheduled events and re-runs the modelling and scheduling processes, identifying when future shortfalls will occur based on actual management and weather up to now, and forecast weather into the future and produces an updated schedule calendar for the rest of the growing season.

There are three ways that irrigation and nitrogen can be scheduled:

1. Variable rate with fixed timing:
   - a. For irrigation this might be used when water is available on a fixed rotation and a farmer wants to know how long to run the irrigation system for to ensure the crop won't become stressed prior to the next possible irrigation event. In this situation the system finds the first shortage event and then steps back to the previous fixed time when irrigation could be applied. It then sets the amount to be applied equal to the soil water deficit on that day so the soil is re-filled but no drainage occurs.
   - b. For nitrogen this might be used when fertigation (combined irrigation and fertilisation) or nitrogen spreading machinery is available at fixed timings. The timing of applications is distinguished as above. The rate is calculated as the total difference between supply and demand from the time of application until the next possible application event.

2. Variable timing with fixed rate
   - a. For irrigation this might be used when a farmer has flexibility in the frequency with which a crop can be irrigated but no flexibility in the amount of water that the irrigation system can supply. In this instance the scheduler 240 will identify shortage events and schedule an irrigation event of the specified (fixed) amount the day prior.
   - b. For nitrogen this might be used when a farmer does not change the calibration on application equipment during the season (always applies the same rate each pass) but has flexibility in when and how often fertiliser is applied. In this instance the scheduler 240 will identify shortage events and schedule a fertiliser event of the specified (fixed) amount several days (usually 3 days) prior.

3. Variable rate and variable timing
   - a. For water this can be used for centre pivot irrigation where a farmer can control rate by adjusting irrigator speed and timing by determining how frequently the irrigator is run. Varying rate and timing is beneficial as it allows very precise control over the supply of water to the crop, which optimises production and minimises the cost of irrigation and the risk of drainage and leaching.

In this instance the invention identifies when the crop will be entering water stress, calculates the soil water deficit on the prior day and sets the irrigation rate on that day to replace the predicted soil water deficit.

b. For nitrogen this might be used when the farmer has flexibility in fertigation practices and wants to closely match nitrogen inputs with crop demand to optimise crop yield but ensure there is no excess in the system that is a risk of leaching. In this instance the scheduler identifies when shortages will begin and what the total shortage will be over an arbitrary (say 3 day) period following this. It then applies this amount of fertiliser several days (usually 3 days) prior the day of shortage to ensure there is just enough nitrogen in the system to adequately supply the crop for the specified period.

Figure 5:
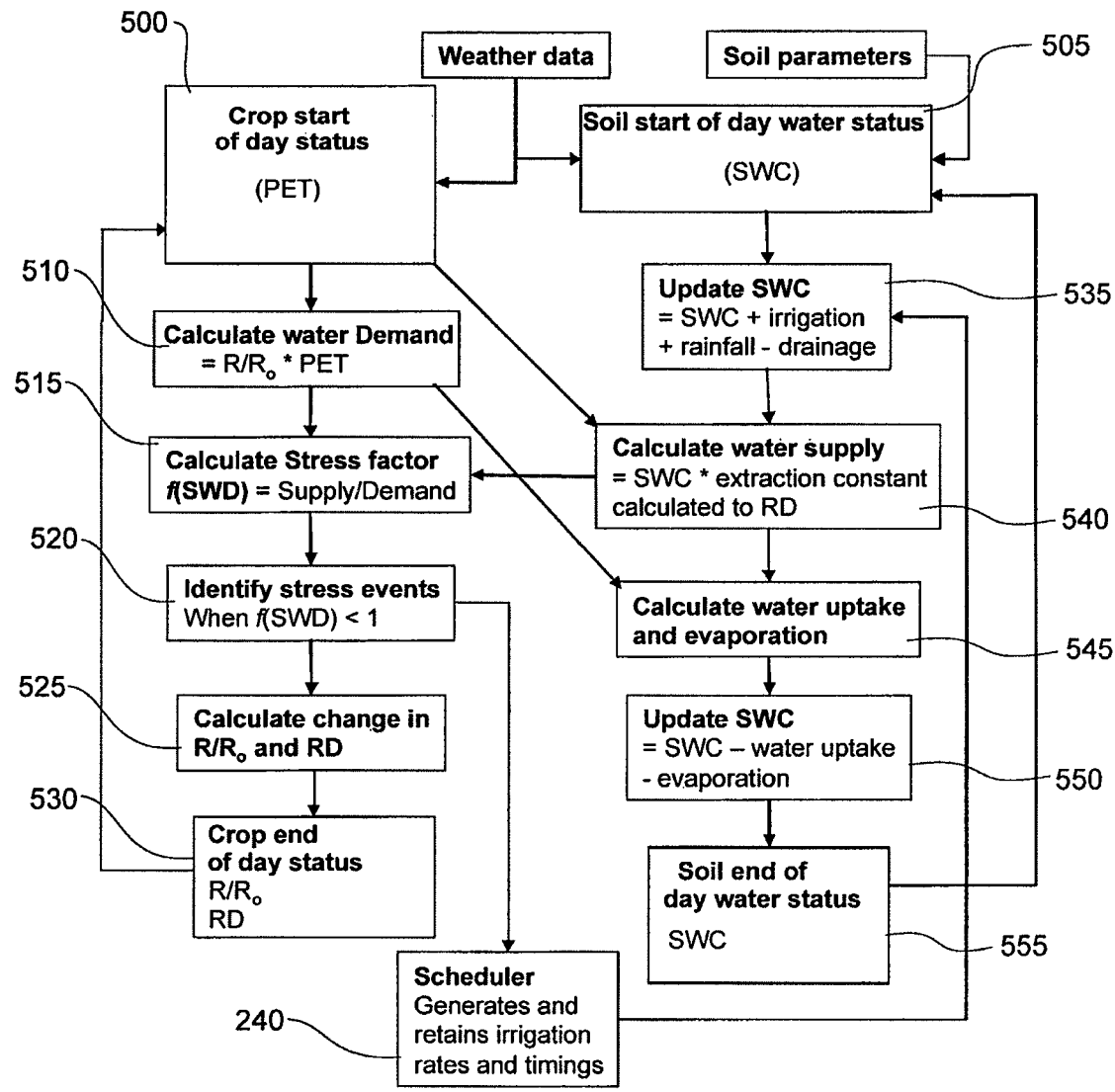
FIG. 5 illustrates key procedures to produce irrigation schedules.

FIG. 5 demonstrates how the system calculates irrigation schedules. The crop model and soil model described above are preferably run on a daily time step. The models start with the initial status of the crop and soil each day. The crop start of day status is shown at 500 and the soil start of day status is shown at 505.

The crop start of day status is represented by potential evapotranspiration (PET), crop cover ($R/R_0$) and root depth (RD).

The soil start of day status 505 is represented by rainfall and soil water content (SWC).

Crop water demand is calculated 510 as a function of the crop cover and the PET. A stress factor 515 is calculated as a function of water supply 540 and water demand 510. The system identifies stress events 520 where water demand is likely to exceed water supply. In these circumstances the scheduler 240 generates and retains irrigation rates and timings.

Then the change is calculated 525 in crop cover and root depth and the end of day status 530 is updated of crop cover and root depth to be fed into the next day start of day status 500.

The soil start of day water status 505 is updated by updating the soil water content (SWC) as a function of irrigation, rainfall and drainage 535. Water supply is then calculated as a function of soil water content and an extraction constant calculated to the root depth (RD). Water uptake and evaporation are calculated 545.

Soil water content 550 is then updated as a function of existing soil water content, water uptake and evaporation. The end of day status of the soil water content is then calculated 555 and fed back into the next day start of day soil water status 505.

Figure 6:
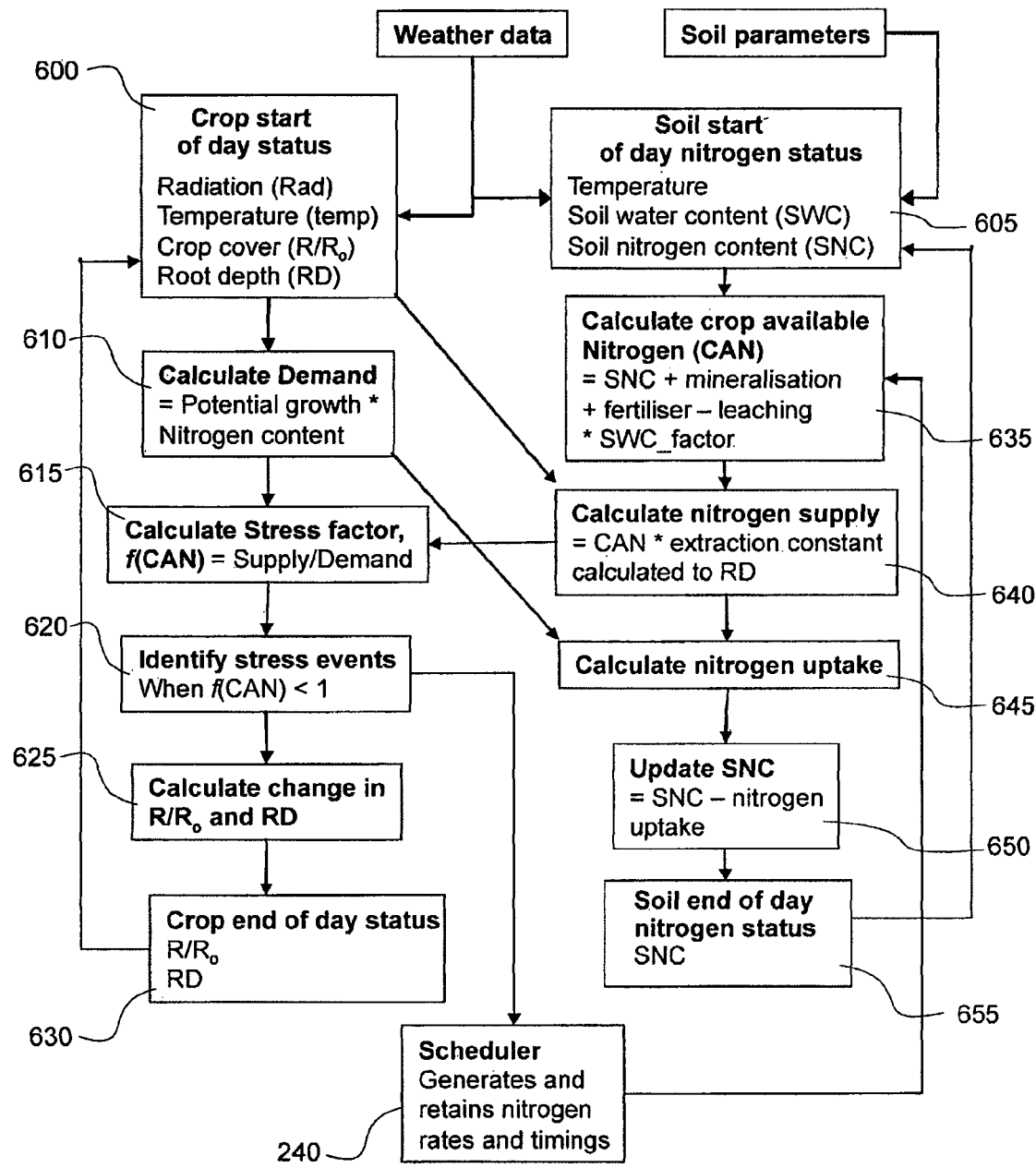
FIG. 6 illustrates key procedures to produce nitrogen schedules.

FIG. 6 shows calculation of nitrogen schedules. Once again the system calculates a crop start of day status 600 and a soil start of day status 605. The crop start of day status 600 is represented by radiation (RAD), temperature (TEMP), crop cover ($R/R_0$) and root depth (RD). Crop nitrogen demand is calculated 610 as a function of potential growth and nitrogen content. A stress factor 615 is calculated as a function of nitrogen supply and nitrogen demand. Stress events are identified 620 where nitrogen demand exceeds nitrogen supply. Where nitrogen demand exceeds nitrogen supply the scheduler 240 generates and retains nitrogen rates and timings.

Then the change is calculated 625 in crop cover and root depth. The end of day status 630 is then calculated by updating crop cover and root depth. These updated values are fed back to the next day crop start of day status 600.

Once the soil start of day nitrogen status 605 is determined, the crop available nitrogen (CAN) is calculated 635. The CAN is a function of soil and nitrogen content, mineralisation, fertiliser, leaching and a factor of soil water content.

Nitrogen supply is calculated 640 as a function of crop available nitrogen, and an extraction constant calculated to a root depth.

Nitrogen uptake is calculated 645.

The soil nitrogen content is updated 650 as a function of existing soil and nitrogen content and nitrogen uptake. The end of day status of soil and nitrogen content is then calculated 655 and fed back to the next day soil start of day status 605.

Yield Prediction

A further aspect of the invention involves the analysis and monitoring of crop yields and harvest dates. Analysing the performance of crops is useful for identifying factors that are limiting yield and may be addressed to either improve production or reduce resource inputs to match possible production.

Figure 7:
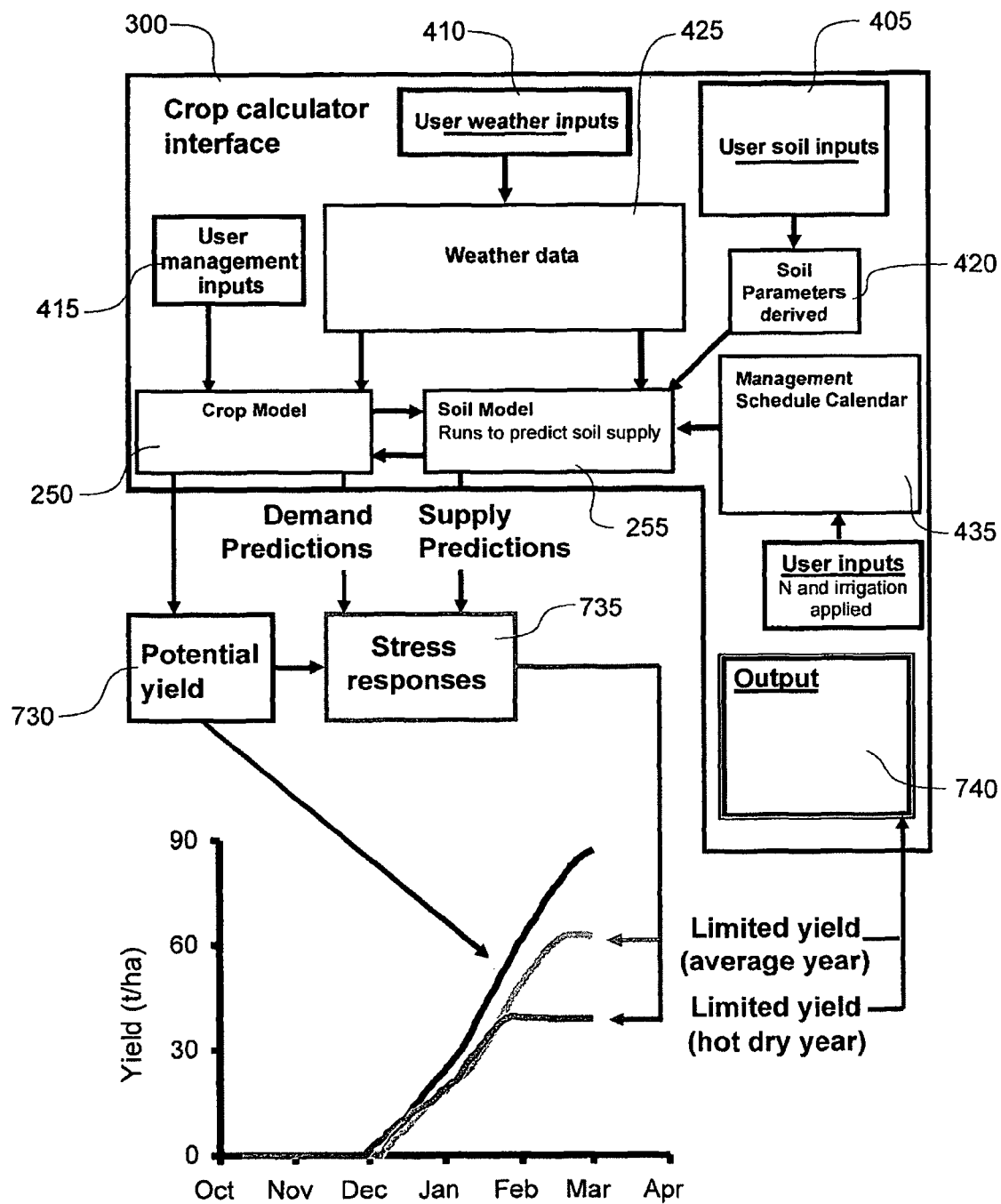
FIG. 7 illustrates key procedures to analyse and monitor crop yields.

FIG. 7 demonstrates predictions of yields using crop and soil models. The system integrates most of the important factors that influence yield and can quantify the cause and extent of yield limitations with greater certainty than other methods. The quantification of yield limitations allows a value to be put on this limitation. The ability of the invention to run "what if" management scenarios and to predict subsequent yields enables producers to make informed decisions on the outcomes of changing management to address the identified yield limitations. The alternative is field scouting where agronomists or consultants make qualitative observations of some of the factors that influence yield and make subjective predictions on whether yield is limited or not.

Monitoring crop yields is necessary for forecasting yields so crop processors can plan logistics. The system's use of crop and soil models offers a unique advantage here because it outputs predictions of yield and maturity date in many individual fields in response to their specific soil, management and weather each year. This enables forward planning of total production volumes and the spread of harvest timings. Predictions of yields and harvest dates can be updated through each season to take account of weather variation and reduce uncertainty in predictions as the season progresses. The alternative to this is processing managers' planning production capacity and the spread of harvest based on historical information and making destructive measurements in individual fields to check for variation from this each year. This is imprecise and time consuming.

FIG. 7 shows the crop calculator interface 300 performing predictions of crop yield. Input data includes user soil inputs 405, user weather inputs 410 and user manual inputs 415.

Once again for user soil inputs 405 the user enters paddock specific test results for:

a. Soil texture profile
b. Soil bulk density profile (or some surrogate)
c. Soil mineral nitrogen profiles at or before planting (mineral nitrogen profile)
d. Topsoil nitrogen mineralisation results (mineralisable nitrogen).

For user weather inputs 410 the user specifies the nearest weather station from a list of available stations. The system collates up to date actual data and long term average or forecast data from a variety of sources including the internet and private weather stations for that station for:

a. Temperature (minimum and maximum)
b. Rainfall
c. Solar radiation
d. Potential evapotranspiration.

For user management input 415 the user specifies the management the user will impose and has imposed on the crop. These inputs include:

a. Planting date, row and plant spacing (plant population)
b. Cultivar (the specific variety of crop to be grown)
c. Nitrogen management constraints (application rate and timing limitations)
d. Water management constraints (application rate and timing limitations)
e. Actual management to date (specified for in season updates).

The interface 300 collates the above data specific to individual paddocks or areas within a paddock. The system collects information and performs the functions described below for any number of paddocks that the user chooses to specify. The invention then derives necessary parameters from this information. These parameters include soil parameters 420 and weather data 425. Weather data 425 includes long term average weather and actual past weather. Long term average weather is used as a forecast. Actual past weather replaces average weather each time the mode is updated.

The system then invokes crop model module 250 to predict potential yield 730 and crop demands. The system runs soil model module 255 with the specified management schedule calendar 435 (represents actual and/or intended irrigation and fertiliser events) to predict soil supply. Stress responses 735 and limited yield are then calculated. The resulting series of events is an output 740 that represents a report of potential and limited yields under defined climate soil and management.

The system uses inputs collated by the interface and crop models (as described above) to determine potential yield according to the effects of temperature on the development (duration) of the crop from the planting date to the harvest date, the effects of temperature on the development of the crop's leaf area index and radiation interception and the effects of temperature on radiation use efficiency. This defines what the potential stress-free yield of a given cultivar will be at a given geographical location for a given planting date.

The system then runs the crop models using irrigation and nitrogen events specified in the schedule calendar, the initial status of the soil, water added from rainfall, and nitrogen added by mineralisation to determine the timing and extent of water and nitrogen shortages and predict the yield that the crop can achieve with the predicted water and/or nitrogen limitations. The limited yield predicts what a given cultivar's yield will be at a given geographical location for a given planting date on a given soil type with a specified initial nitrogen and water status with a specified climate and management schedule.

Figure 8:
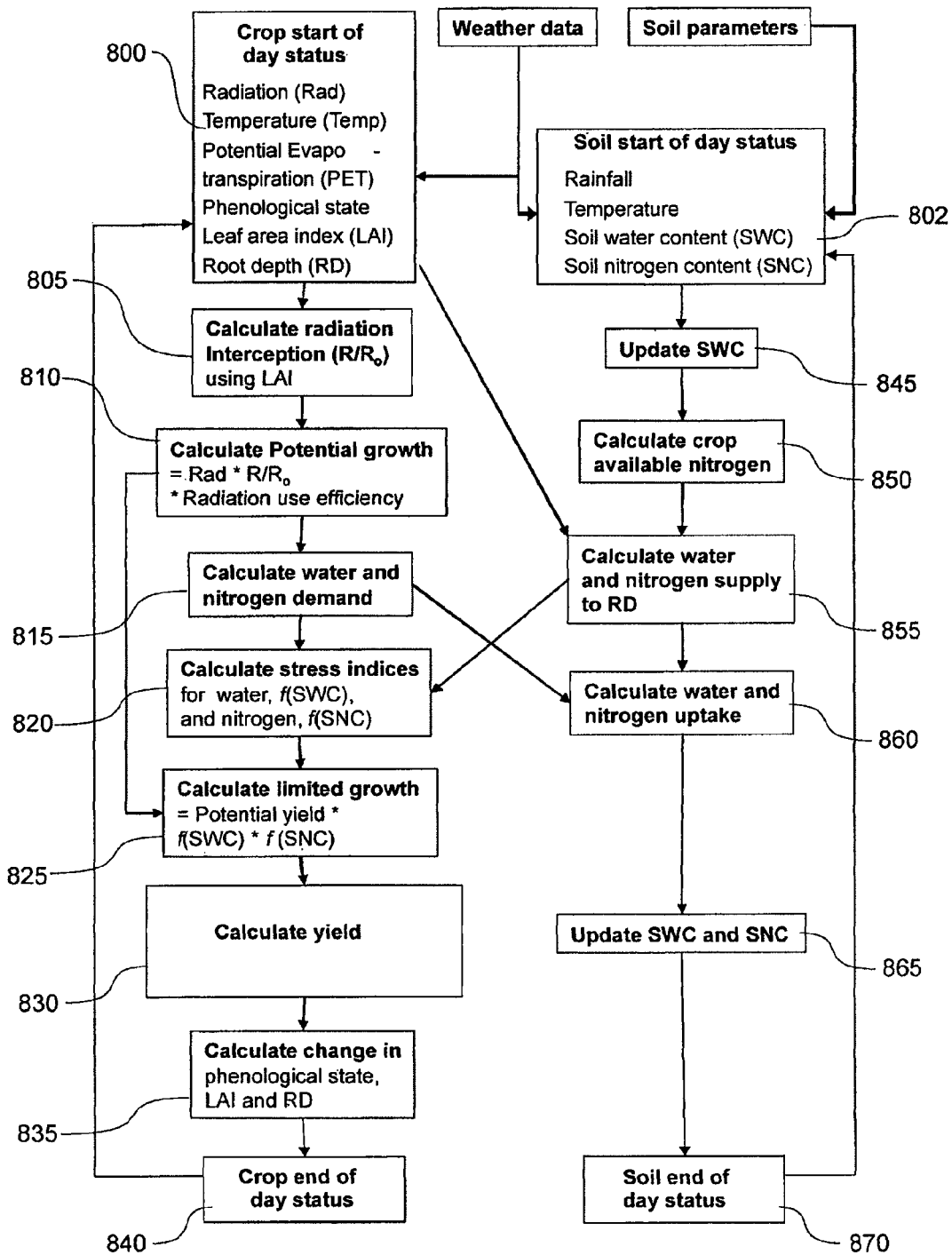
FIG. 8 illustrates key procedures carried out to predict potential and limited yields.

FIG. 8 shows in more detail how the system predicts yield. The crop model and soil model described above are preferably run on a daily time step. The models start with the initial status of the crop and soil each day. The crop start of day status is shown at 800 and the soil start of day status is shown at 802.

The crop start of day status is represented by radiation (RAD), temperature (TEMP), potential evapotranspiration (PET), phonological state, leaf area index (LAI) and root depth (RD).

The soil start of day status 802 is represented by rainfall, temperature, soil water content (SWC) and soil nitrogen content (SNC).

Radiation interception is calculated 805 as $R/R_0$ using leaf area index (LAI).

Potential growth is calculated 810 as a function of radiation (RAD), radiation interception ($R/R_0$) and radiation use efficiency. Water and nitrogen demand is calculated 815. Stress indices are then calculated 820. Stress indices for water are calculated as a function of soil water content and nitrogen stress indices are calculated as a function of soil nitrogen content. Limited growth is calculated 825 as a function of potential yield, stress indices for water and stress indices for nitrogen.

Yield is then calculated 830. Biomass is partitioned between leaf, stem and yield depending on phonological state. The change in phonological state, leaf area index and root depth are then calculated 835.

The end of day status 840 is calculated and fed back into the next day crop start of day status 800.

The soil start of day status 805 is updated by updating the soil water content 845.

Crop available nitrogen is calculated 850. Water and nitrogen supply to root depth is calculated 855.

Water and nitrogen uptake is calculated 860.

Soil water content and soil nitrogen content are then updated 865. The end of day status is calculated 870 and fed back into the soil start of day status 805.

In theory it should be possible for a crop to attain the potential yield that the invention calculates if it never encounters shortages of water, nitrogen or other nutrients or burdens from pests or disease. Identification of yield limitations is done by setting the invention's user inputs (FIG. 7, soil, weather and management) to represent a past crop of known yield. Firstly, the invention can determine if water or nitrogen shortage reduced yield below potential. This is done by simply comparing potential and limited yields (as output by the invention, FIG. 7) and if the limited yield is lower than potential, then the crop encountered shortage. Comparison of water and nitrogen supply with demand will identify which was limiting and a skilled operator can determine if alternative management strategies (such as following the management recommended by the invention) might improve yield. If the observed yield (as measured in the field) was less than the limited yield then something other than water or nitrogen was reducing yield and the farmer knows to look for other mineral deficiencies or disease problems.

Crop processors are interested in monitoring the yield and development of crops so they can make decisions on when to start factories, how much storage may be needed and if crops may need to be sourced from or moved to other areas to fill processing capacity. Yield and timing of crop maturity varies from year to year depending on the weather conditions experienced in that year and the effect they will have on planting dates, development rates and water shortages. The invention uses crop and soil models and user defined inputs (FIG. 7) to predict the yield of any number of defined paddocks and to predict when each paddock will be ready for harvest. Aggregation of this information can then be provided to processors to plan harvesting, transport and processing logistics.

Predictions of Drainage and Leaching

A further aspect of the invention is the analysis and monitoring of resource loss. Resources can be lost from crop production systems through the drainage of water and leaching and nitrification of nitrate from fertilisers.

This represents an economic cost to farmers who will have paid for the acquisition and application of those resources, and who may have to pay to replace them if they are lost.

It also represents an environmental cost since drainage reduces water use efficiency, which increases the amount of fresh water that is removed from natural ecosystems for irrigation and can increase the salinity of ground water. Fertiliser leaching has a negative environmental impact because it contaminates ground and surface water. Nitrification is a negative impact because it produces nitrous oxide which is a potent green house gas. Currently there is no alternative method for analysing or monitoring resource losses.

Leaching is calculated from the amount of water that drains from the crops root depth and the nitrogen concentration of this water.

Figure 9:
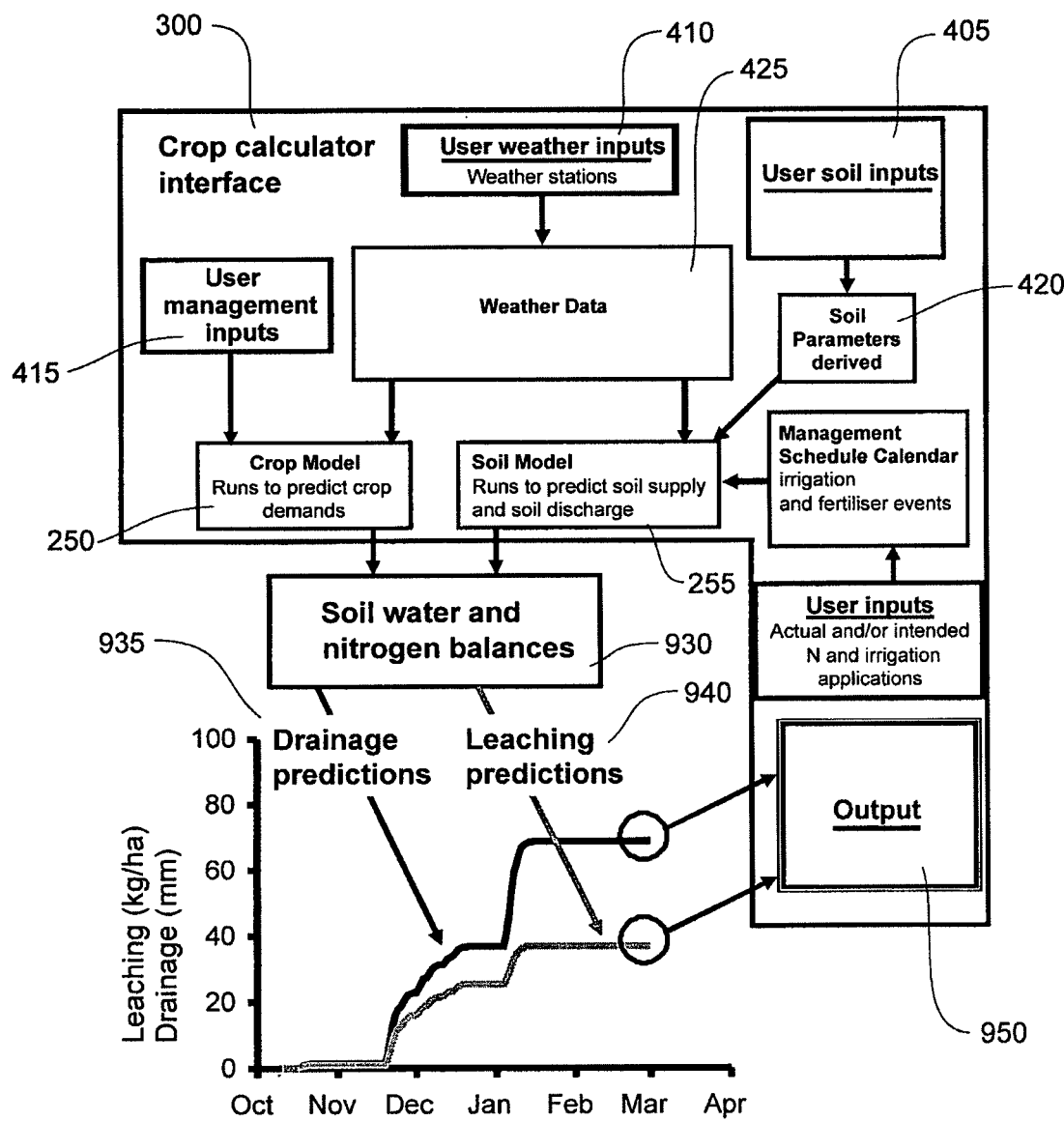
FIG. 9 illustrates key procedures to analyse and monitor resource losses from crops.

FIG. 9 demonstrates the analysis and monitoring of resource loss. The crop calculator interface 300 performs all the necessary collation and storage of information. The input data includes user soil inputs 405, user weather inputs 410 and user management inputs 415.

For user soil inputs 405 the user enters paddock specific test results for:
a. Soil texture profile
b. Soil bulk density profile (or some surrogate)
c. Soil mineral nitrogen profiles at or before planting (mineral nitrogen profile)
d. Top soil nitrogen mineralisation results (mineralisable nitrogen).

For user weather inputs 410 the user specifies the nearest weather station from a list of available stations. The system collates up to date actual data and long term average or forecast data from a variety of sources including the internet and private weather stations. This data is represented by:
a. Temperature (minimum and maximum)
b. Rainfall
c. Solar radiation
d. Potential evapotranspirations.

For user management inputs 415 the user specifies to the management they will impose and have imposed on the crop. This data includes:
a. Planting date, row and plant spacing (plant population)
b. Cultivar (the specific variety of crop to be grown)
c. Nitrogen management constraints (application rate and timing limitations)
d. Water management constraints (application rate and timing limitations)
e. Actual management to date (specified for in season updates).

The interface 300 collates the above data specific to individual paddocks, or areas within a paddock, and can collect information and perform the function as described below for any number of paddocks the user chooses to specify. The invention then derives necessary parameters from this information. These parameters include soil parameters 420 and weather data 425. Weather data 425 includes long term average weather and actual past weather. Long term average weather is used for forecasting. Actual past weather replaces average weather each time the model is updated.

The system then invokes crop model module 250 to predict crop demands. The system runs soil model module 255 to predict soil supply.

The system calculates soil, water and nitrogen balances and makes drainage predictions 935 and leaching predictions 940. The output from the system 950 is a report of the amount of drainage and leaching from the crop.

Figure 10:
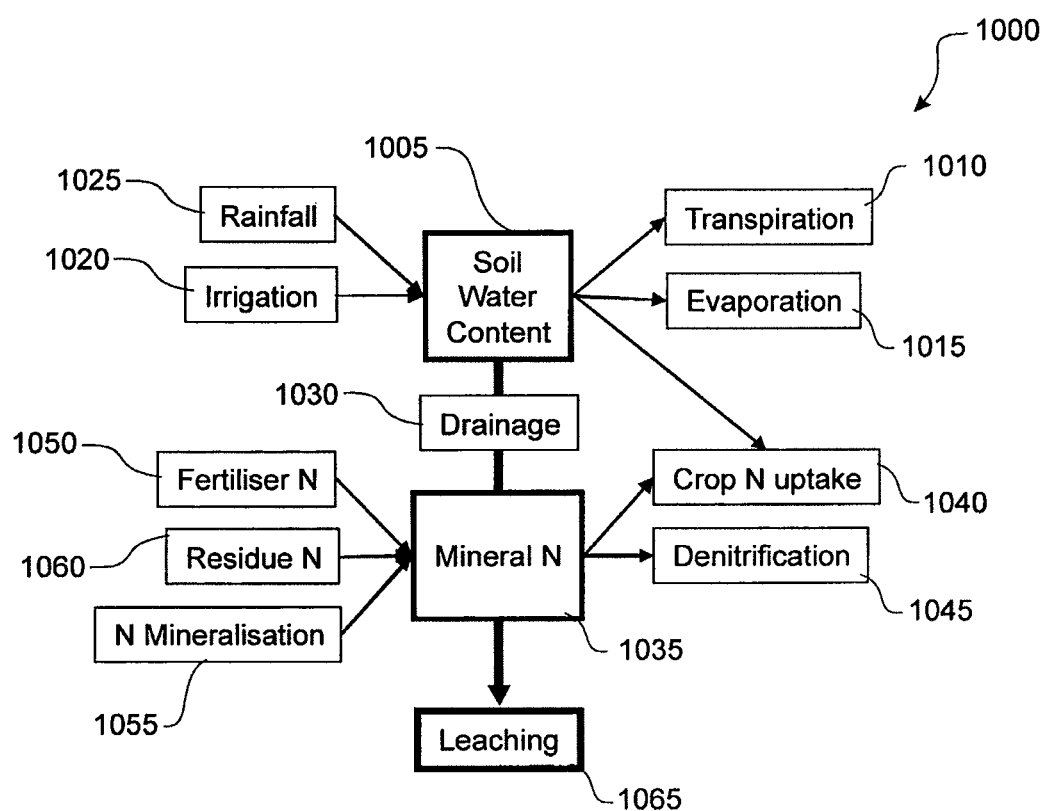
FIG. 10 illustrates the key process used in predicting drainage and leaching.

FIG. 10 shows one preferred form model 1000 for calculating water balance. The water content of soil layers is calculated 1005 daily. Water is removed throughout the rooting depth of the crop by transpiration 1010 and is removed from the top soil layer by evaporation 1015. Water is added into the top layer from irrigation 1020 and rainfall 1025 and any water in excess of the drained upper limit drains 1030 to the next soil layer. Water cascades down through the soil profile as subsequent layers fill up and water that drains from below the crops rooting depth is considered to be drainage.

Nitrogen balance is calculated where the nitrogen content of soil layers 1035 is calculated daily. Nitrogen is removed through the rooting depth of the crop by crop uptake 1040 and denitrification 1045. Nitrogen fertiliser 1050 residual nitrogen 1060 and mineralised nitrogen 1055 are added to the top soil layer. Mineral nitrogen 1035 occupies three compartments in the soil: unavailable, available (can be extracted by plants) and mobile (moved to deeper layers by drainage). Nitrogen equilibrates between these compartments and the concentration of nitrogen in the mobile water at the bottom of the root depth is used to calculate leaching 1065 in combination with drainage amount.

Drainage and leaching can be caused by inappropriate irrigation and fertilisation practices in the field but the extent of the problem is often not recognised because they are not easily measured. The system is able to predict the extent and timing of drainage and leaching in response to soil type, climate and management. This demonstrates the extent of possible resource loss.

Farmers adhering to frequently updated irrigation schedules generated by the above system may greatly reduce the risk of drainage by matching irrigation applications to water demand and not over-filling the soil.

Similarly, the nitrogen schedules produced by the system reduce the risk of nitrogen leaching by matching nitrogen supply to demand to ensure the nitrogen content in the soil does not increase to high values. A skilled operator of the tool may also use it to identify further possibilities to change management to reduce resource waste.

Increasingly consumers are concerned about the environmental impact of the production of the food they are consuming, so producers and retailers are moving to provide information about the sustainability of production systems of products they sell. Good Agricultural Practice (GAP) programs are being developed around the world, and to meet GAP standards farmers may need to provide audit for the environmental impact of each crop they grow.

The system provides a simple mechanism for providing this audit because it keeps records of the amount of irrigation and nitrogen applied and predictions of the amount of drainage and leaching that occurs.

Outputs from the system include pass or fail grades for drainage or leaching standards which are given at the end of the season once actual weather and management information is added to the calculator. The invention also produces water footprint values for crops. Nitrous oxide predictions and the collection of cultivation information allow the invention to calculate carbon footprints.

Experimental Results

The following table shows data representing an average from five trials conducted in commercial potato fields in South Canterbury, New Zealand.

| COMMERCIAL ASSESSMENT | | | | |
|---|---|---|---|---|
| | Basal | Scheduled | Grower | LSD |
| N applied (kg/ha) | 100 | 185 | 314 | |
| Yield (t/ha) | 63.0 | 67.3 | 68.6 | 3.55 |

The trials involve three different treatments.

The first treatment known as "Basal" treatment received only 100 kilograms of nitrogen at planting.

"Scheduled" treatments received nitrogen as scheduled by the system described above.

"Grower" treatments received nitrogen in accordance with what the grower applied to the rest of the paddock.

As shown in the table, the amount of nitrogen applied in kilograms per hectare was 100 from the basal treatment, 185 for the Scheduled treatment and 314 for the Grower treatment. The scheduled treatment required on average only 85 kilograms of nitrogen more than the Basal treatment.

The resulting yield in tonnes per hectare was 63 for the Basal treatment, 67.3 for the Scheduled treatment and 68.6 for the Grower treatment. The increase from 63 tonnes per hectare for the Basal treatment to 67.3 tonnes per hectare for the Scheduled treatment represents a significant yield increase. This demonstrates that the crops actually required the extra nitrogen scheduled. The extra nitrogen gave a yield benefit.

Under the Grower treatment the growers applied 139 kilograms of nitrogen more than that required by the Scheduled treatment. There was not a significant yield difference between the Scheduled treatment and the Grower treatment. The increase was only from 67.3 tonnes per hectare to 68.6 tonnes per hectare.

This shows that the extra nitrogen applied by the growers was not needed and the growers could have achieved the same yield, spent less on fertiliser and reduced leaching risk by following the recommendations set out by the invention.

Figure 11:
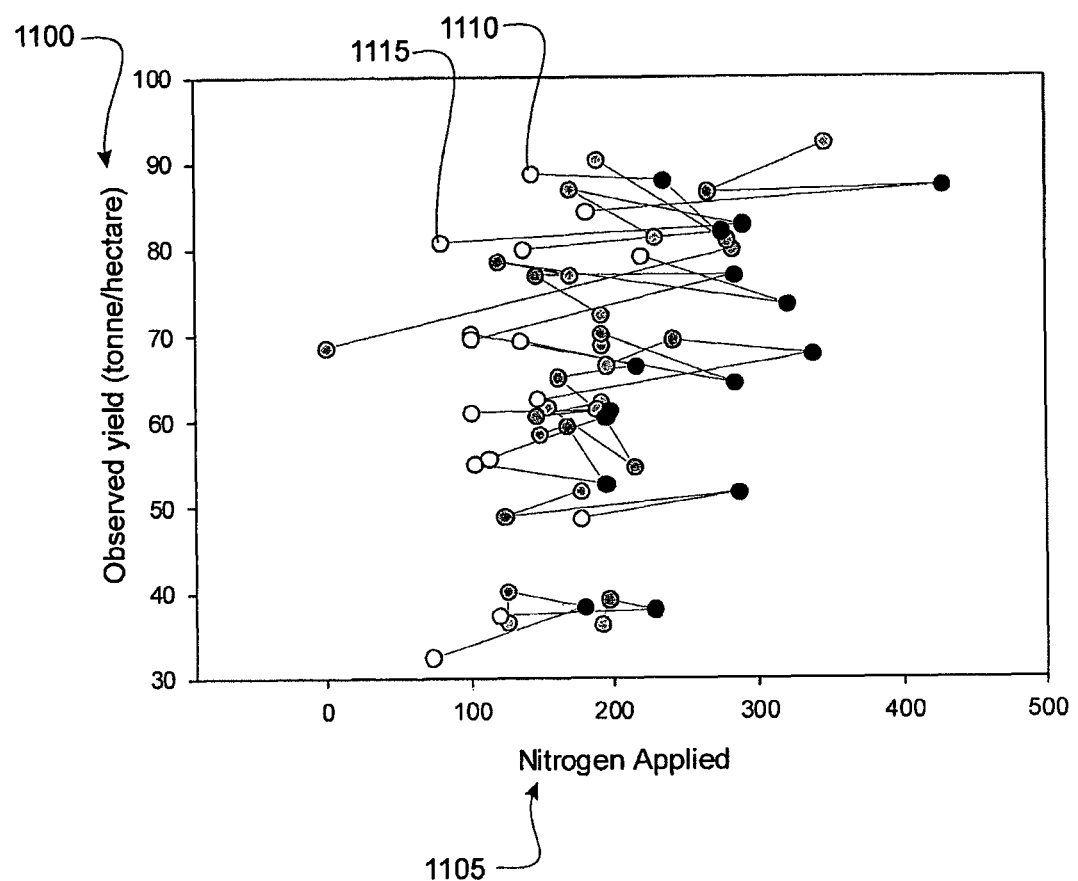
FIG. 11 shows crop yield responses.

FIG. 11 shows a chart representing crop yield responses 1100 to nitrogen fertiliser applied 1105.

Nitrogen application rates specified by the system are indicated by the white symbols (for example at 1110 and 1115). The data shows that the system consistently scheduled nitrogen at the low end of the range. Because the lines are essentially flat with a low gradient there was no yield response to applying more additional nitrogen fertiliser than that scheduled by the system.

Figure 12:
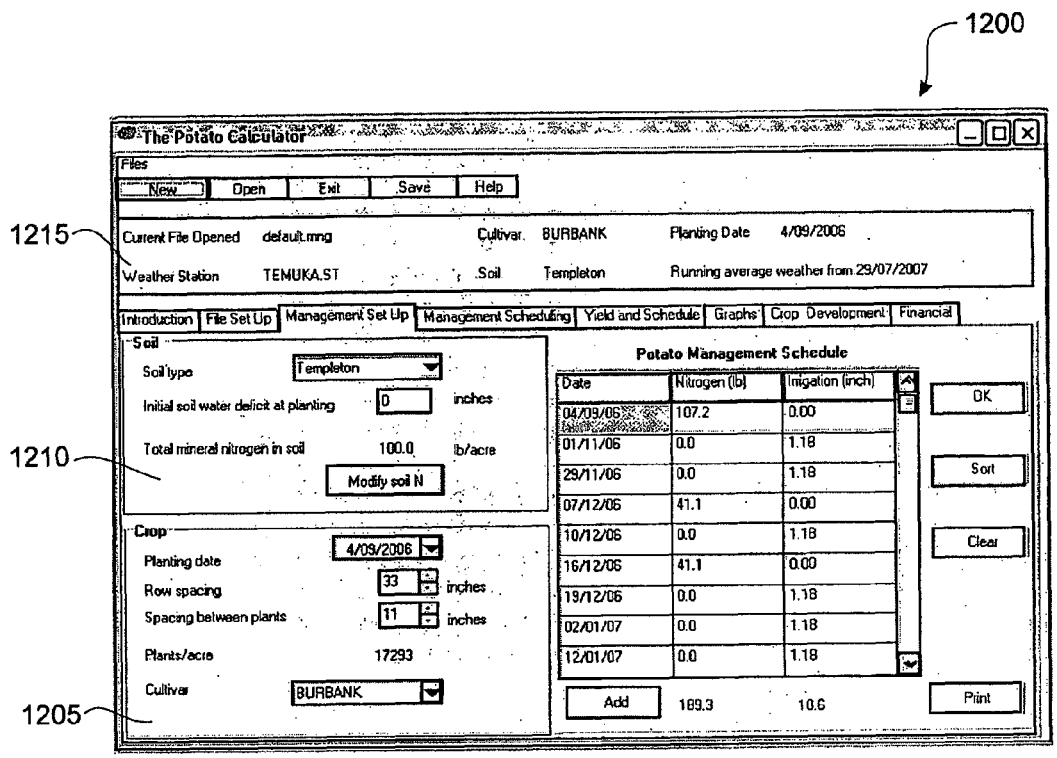
FIG. 12 shows a preferred form user interface screen.

FIG. 12 shows a sample user interface screen 1200 presented to a user on a display associated with the user computing device 135. The interface refers to tubers. It will be appreciated that the interface could be used for other crops. It will also be appreciated that the actual presentation and implementation of the user interface can vary significantly.

As shown in FIG. 12, the system obtains crop details 1205 from the user. These crop details include at least a planting date. Further optional crop details include row spacing, spacing between plants, plants per acre and the name of cultivar planted.

The system also obtains from the user soil description data 1210. This soil description data 1210 is representative of the geographic area of the tuber crop. Soil description data includes for example soil type, initial soil water deficit at planting and total mineral nitrogen in the soil. Soil description data further includes moisture content at drained upper limit, wilting point and/or saturation point. Soil description data further includes available water holding capacity, percolation co-efficient, mineralization constant, organic N, denitrification constant, and/or inorganic N.

The system also obtains weather data that is representative of the geographic area of the tuber crop. This weather data is obtained from a weather station as shown at 1215. This weather data includes for example solar radiation, maximum and minimum temperatures and precipitation. Weather data could also include wind run and humidity.

Figure 13:
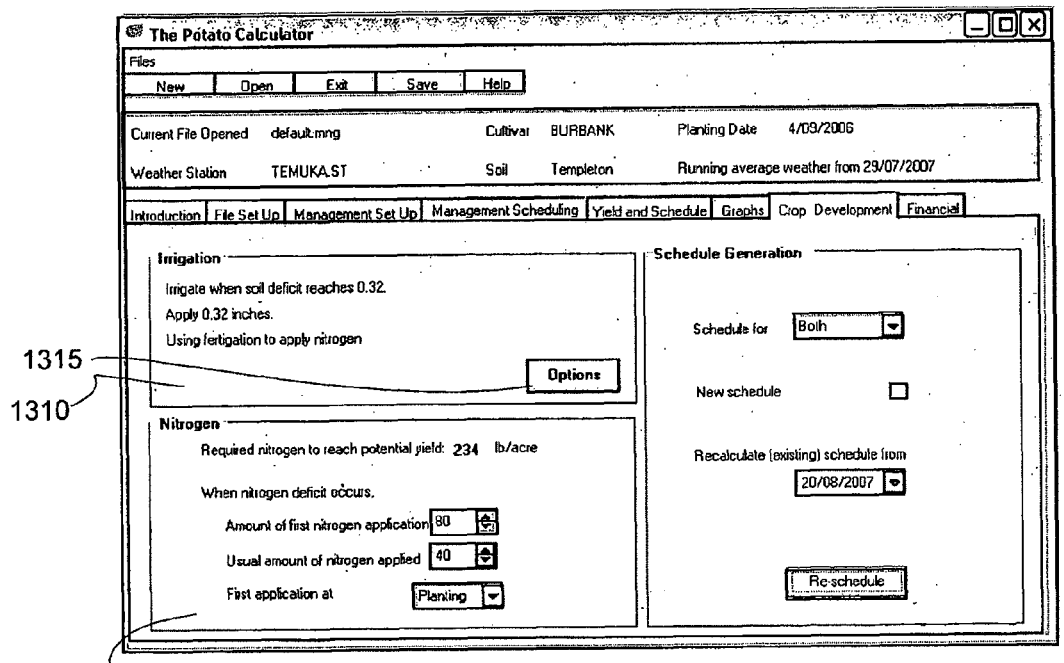
FIG. 13 shows a further preferred form interface screen enabling a user to perform management scheduling.

FIG. 13 shows a preferred form interface 1300 enabling a user to perform management scheduling.

Nitrogen scheduling 1305 enables a user to specify the amount of first nitrogen application, the usual amount of nitrogen applied and the timing of the first application. The user is also able to specify irrigation options 1310. The user has expressed an intention to irrigate when the soil deficit reaches 0.32, to apply 0.32 inches and to use fertigation to apply nitrogen. The preferred form interface provides an Options button 1315 to enable the user to specify irrigation setup options.

Figure 14:
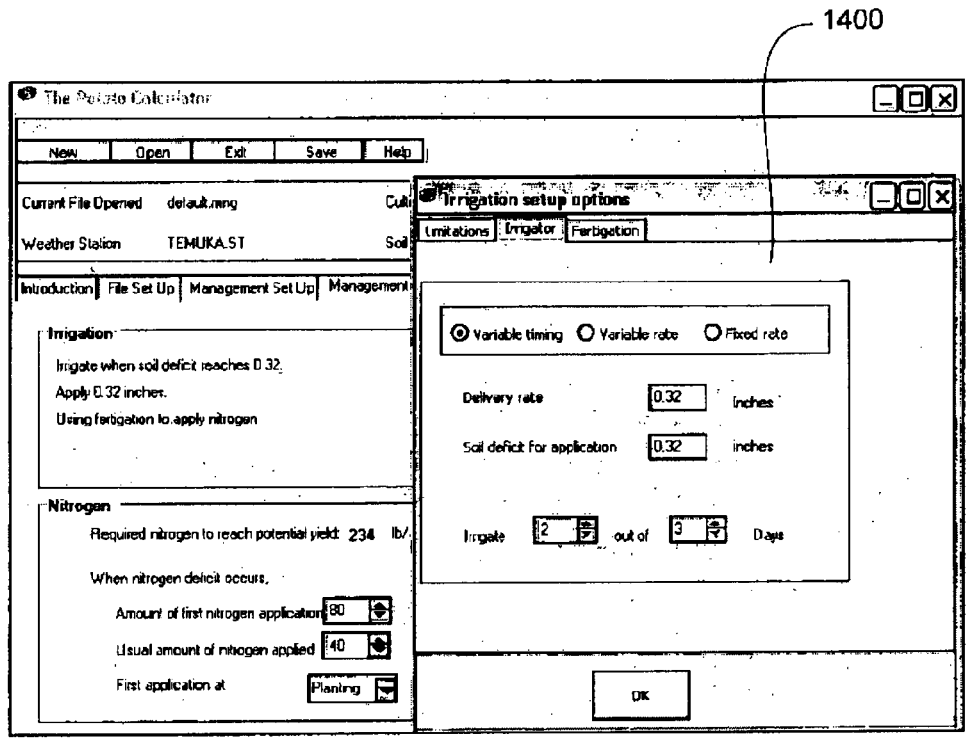
FIG. 14 shows a preferred form user interface screen that enables a user to specify irrigation set up options.

FIG. 14 shows a preferred form user interface that enables a user to specify irrigation setup options 1400.

Figure 15:
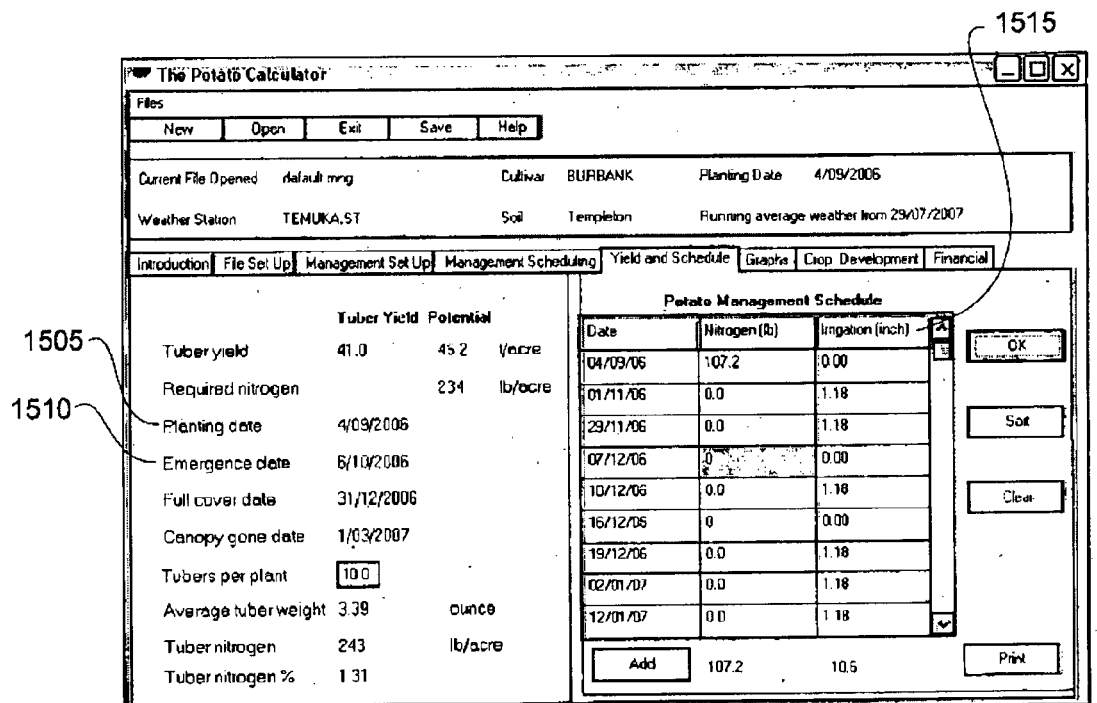
FIG. 15 shows a preferred form schedule generated and displayed to a user.

FIG. 15 shows a preferred form schedule that is generated and displayed to a user as shown at 1500. The planting date 1505 is displayed and has been obtained from the user.

An emergence date 1510 is calculated at least partly from the planting date. The emergence date will usually depend on the particular tuber or cultivar type and also soil description data. A calculated emergence date is also able to be replaced or entered by the user as an actual date once emergence of the crop occurs.

The program optionally further calculates tuber growth commencement date, maximum green leaf area index date (full cover date), and canopy senescence completion date (canopy gone date).

The program calculates a plurality of nitrogen deficit values. These deficit values are calculated at least partly from the emergence date 1510 and the soil description data. The nitrogen deficit values are each associated with respective dates that are each later than the emergence date.

The program further calculates a plurality of water deficit values at least partly from the emergence date and the weather data. The water deficit values are each associated with prospective dates that are each later than the emergence date. As shown in FIG. 15, a schedule 1515 is presented to the user. The schedule includes a plurality of recommended nitrogen application values, irrigation values and application dates. The schedule is calculated at least partly from the nitrogen deficit values and the water deficit values.

To assist in calculating nitrogen deficit values and water deficit values, the program calculates the actual nitrogen and water available to the crop by calculating the crop rooting depth and the daily available soil moisture within the root zone and the nitrogen concentration in the root available soil moisture.

If the user has specified that the crop be given maximum nitrogen and irrigation, then the nitrogen deficit values will correspond closely with the recommended nitrogen application values and the water deficit values will correspond closely with the irrigation values.

In many cases however, the crop will not be supplied with unlimited nitrogen and/or water. There is an associated cost with the application of nitrogen or water. The additional cost of supplying nitrogen or irrigation must be weighed against the potential increase in yield and resulting increase of revenue from sale of that yield.

Figure 16:
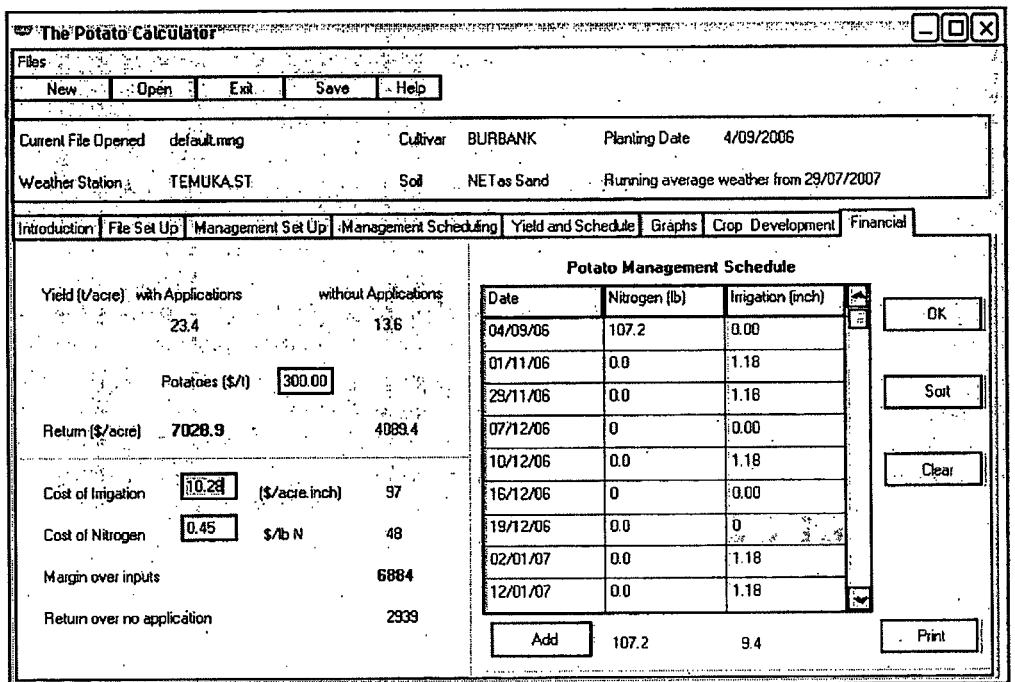
FIG. 16 shows an example financial management screen presented to a user.

FIG. 16 shows an example financial management screen 1600 presented to a user which enables a user to balance the cost of irrigation and nitrogen against revenue derived from an increased yield of the crop.

The program is optionally set to provide a user with various graphs.

Figure 17:
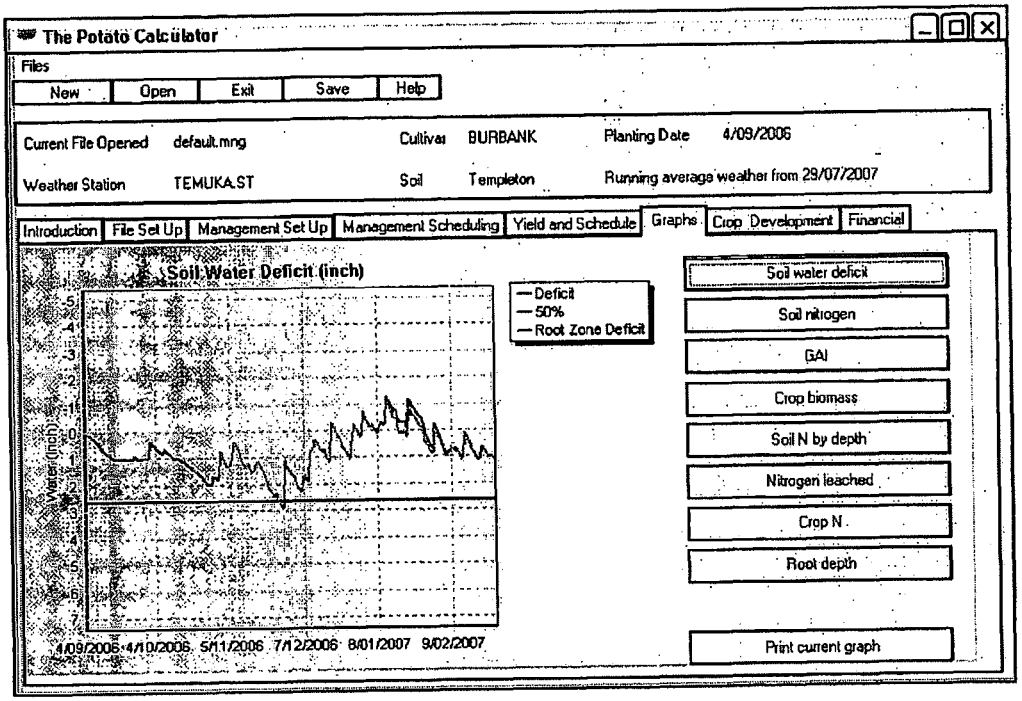
FIG. 17 shows a graphical display of individual water deficit values.

FIG. 17 shows a graphical display of individual water deficit values.

Figure 18:
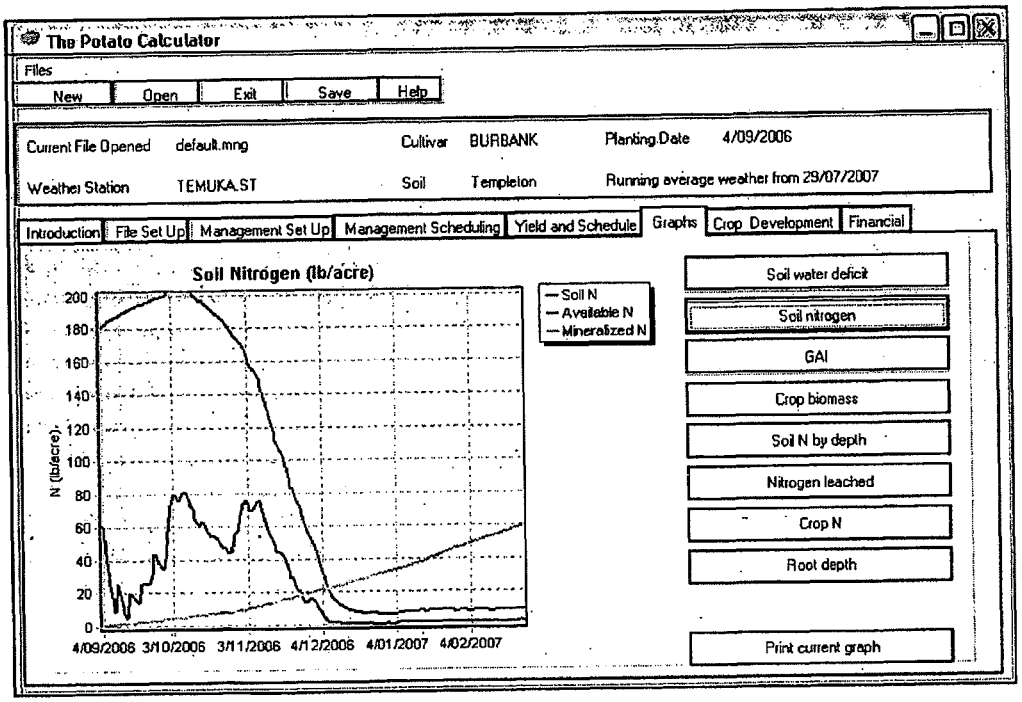
FIG. 18 shows a graphical display of soil mineral and nitrogen values.

FIG. 18 shows a graphical display of soil mineral nitrogen values.

Figure 19:
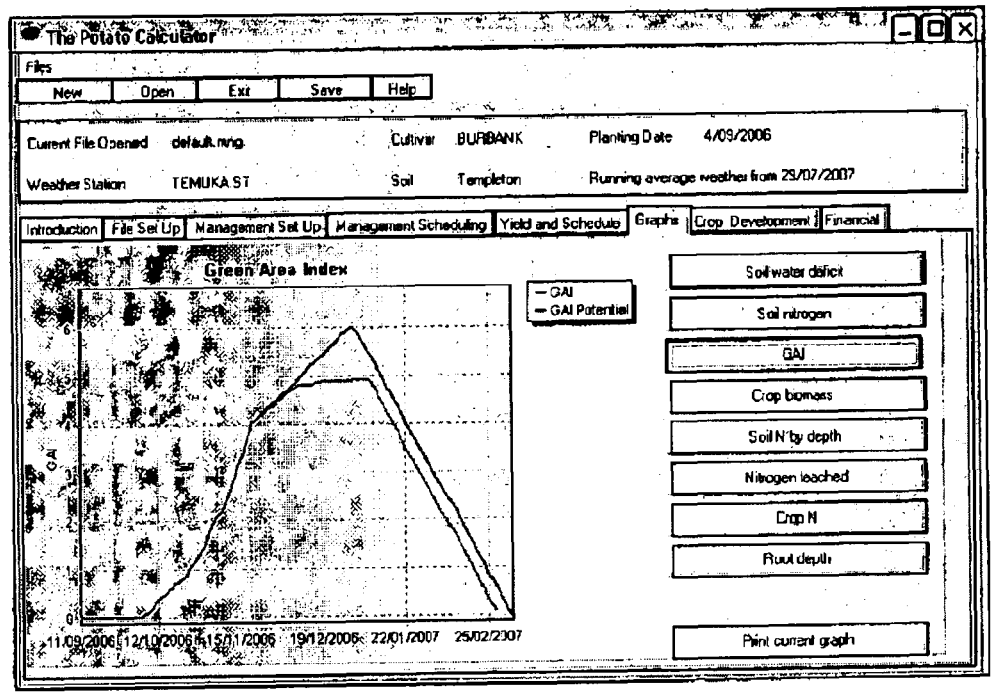
FIG. 19 shows simulation of green leaf area index.

FIG. 19 shows simulation of green leaf area index.

Figure 20:
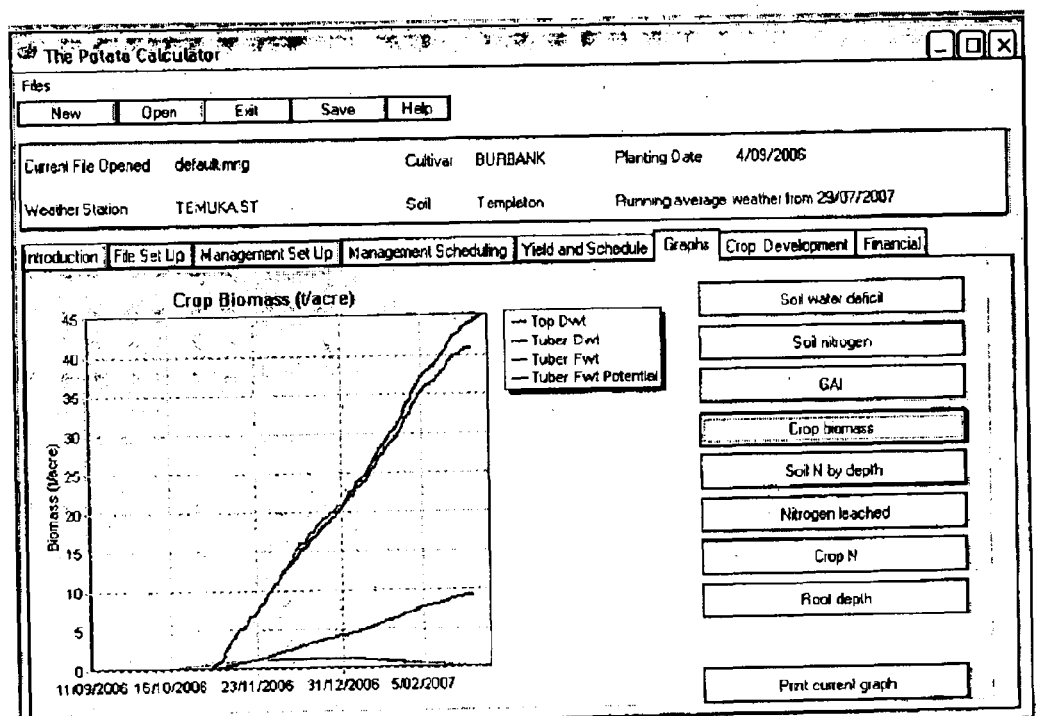
FIG. 20 shows crop biomass calculations.

FIG. 20 shows crop biomass calculations.

Figure 21:
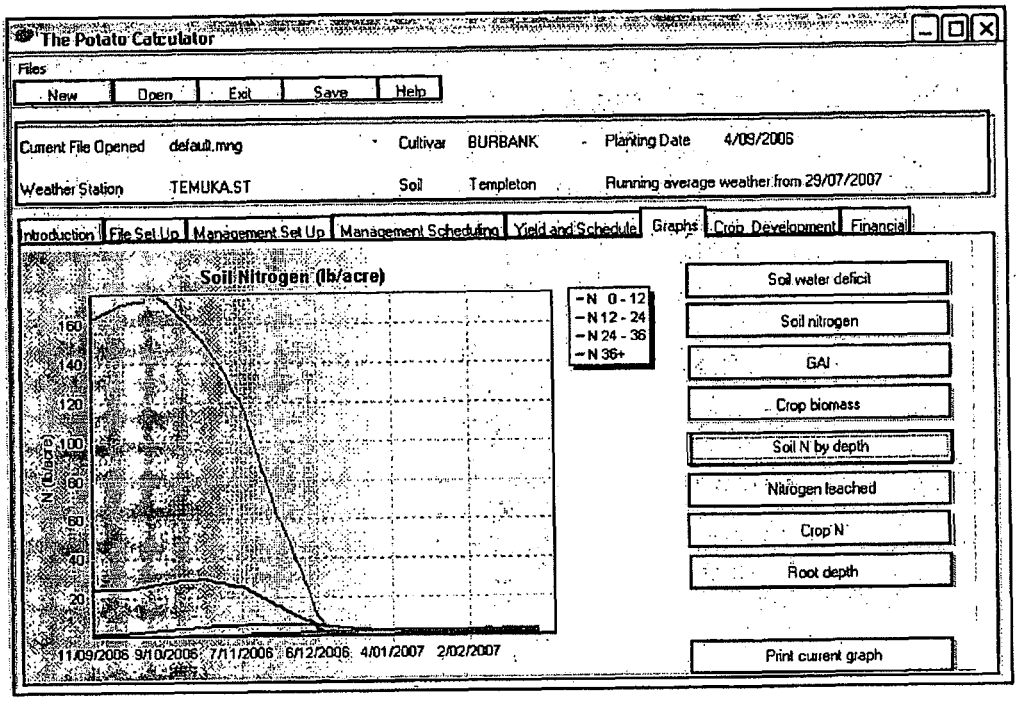
FIG. 21 shows soil, mineral and nitrogen values at various depths.

FIG. 21 shows soil mineral nitrogen values at various depths.

Figure 22:
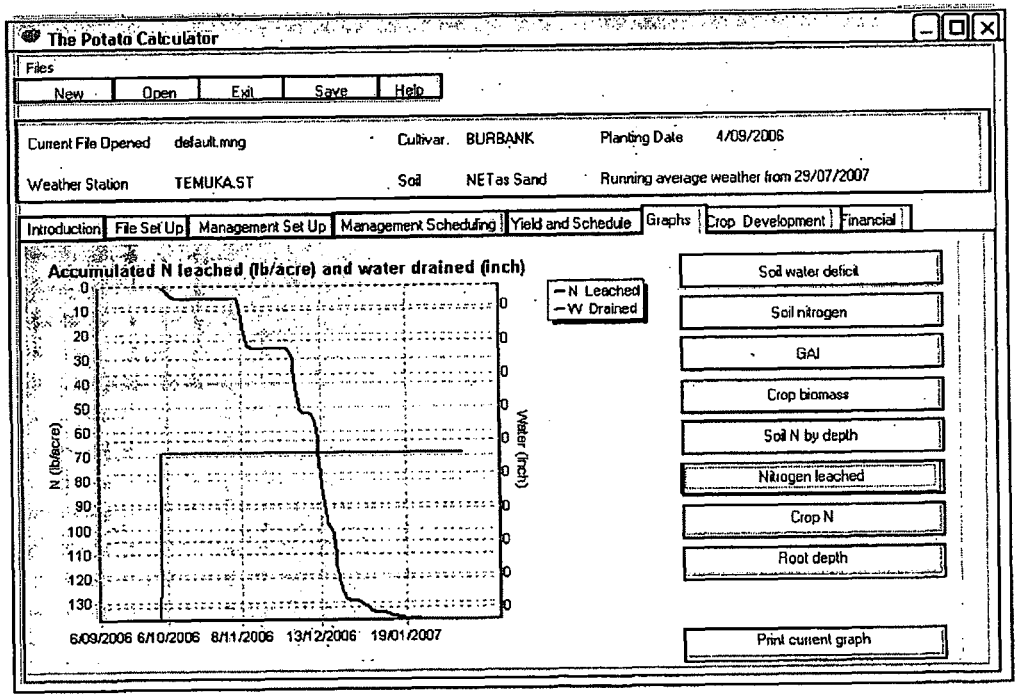
FIG. 22 shows the amount of accumulated nitrogen that is leached and water drained.

FIG. 22 shows the amount of accumulated nitrogen that is leached and water drained.

Figure 23:
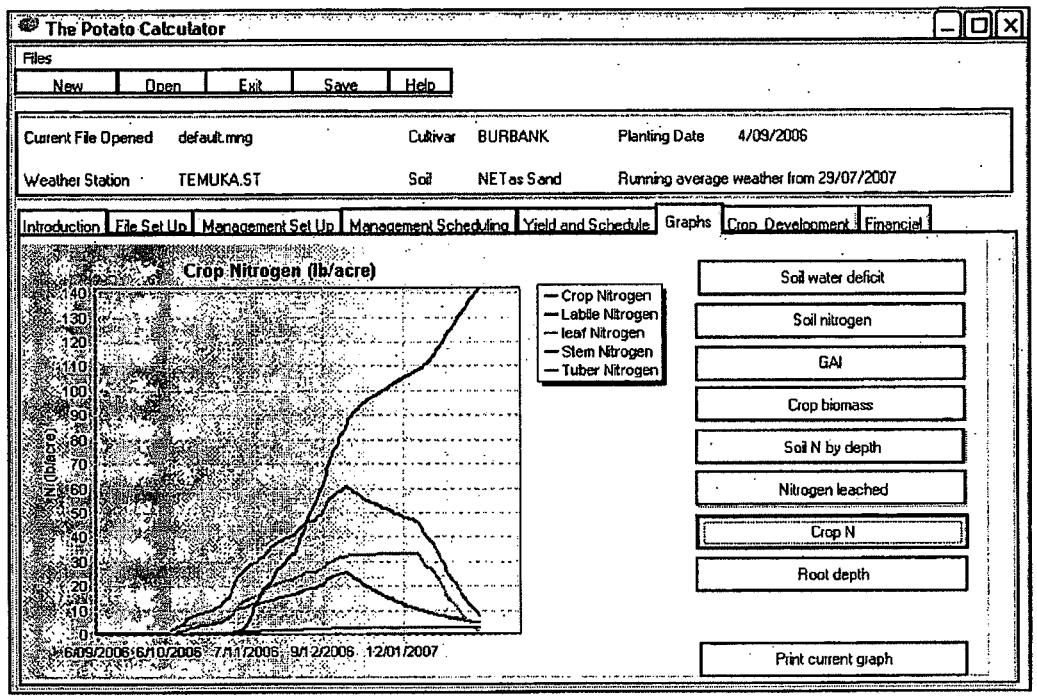
FIG. 23 shows simulations of crop nitrogen.

FIG. 23 shows simulations of crop nitrogen.

Figure 24:
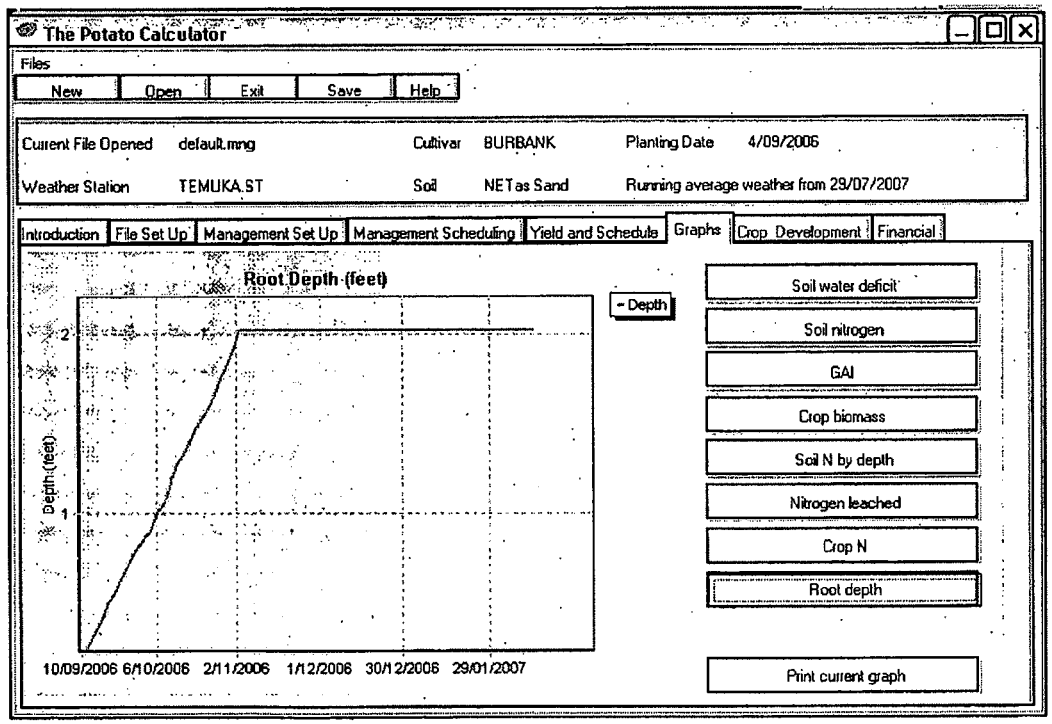
FIG. 24 shows simulated root depth.

FIG. 24 shows simulated root depth.

The foregoing describes the invention including preferred forms thereof. Modifications and improvements as would be obvious to those skilled in the art are intended to be incorporated in the scope hereof as defined in the accompanying claims.

The invention claimed is:

1. A method of proactively managing fertiliser and irrigation inputs for a crop, the method comprising:
    obtaining management data for the crop, the management data including a planting date for the crop;
    obtaining weather data representative of the geographic area of the crop;
    obtaining soil description data representative of the geographic area of the crop;
    storing the management, weather and soil data as a data structure on at least one non-transitory computer readable storage medium;
        calculating an emergence date at least partly from the planting date;
        calculating a plurality of predicted nitrogen deficit values at least partly from the emergence date and the soil description data, the nitrogen deficit values associated with respective dates each later than the emergence date;
        calculating a plurality of predicted water deficit values at least partly from the emergence date and the weather data, the water deficit values associated with respective dates each later than the emergence date; and
        providing a schedule of proactive recommended nitrogen application values, irrigation values and application dates; for future treatment, the schedule calculated at least partly from the predicted nitrogen deficit values and the predicted water deficit values.

2. The method of claim 1 wherein the weather data includes at least one of solar radiation, maximum temperatures, minimum temperatures and precipitation.

3. The method of claim 1 wherein the weather data includes wind run.

4. The method of claim 1 wherein the weather data includes humidity.

5. The method of claim 1 wherein the weather data includes potential evapotranspiration.

6. The method of claim 1 wherein the weather data comprises a plurality of daily values.

7. The method of claim 1 wherein the soil description data includes at least one of soil texture profiles, soil bulk density profiles, soil hydraulic properties by depth, soil organic N content, mineralization coefficient, soil mineral N, and distribution of N within the first meter of soil.

8. The method of claim 1 wherein the emergence date is calculated at least partly from a user input emergence date.

9. The method of claim 1 wherein the management data includes cultivar type.

10. The method of claim 9 wherein the emergence date is calculated at least partly from cultivar type.

11. The method of claim 1 wherein the management data includes nitrogen management constraints.

12. The method of claim 1 wherein the management data includes water management constraints.

13. The method of claim 1 wherein the management data includes actual management to date.

14. The method of claim 1 wherein the emergence date is calculated at least partly from the soil description data.

15. The method of claim 1 further comprising calculating a growth commencement date.

16. The method of claim 1 further comprising calculating a maximum GAI date.

17. The method of claim 1 further comprising calculating a canopy senescence completion date.

18. The method of proactively managing fertilizer and irrigation inputs for a crop of claim 1, wherein the at least one non-transitory computer readable storage medium is in communication with a server.

19. The method of claim 18, wherein the at least one non-transitory computer readable storage medium is part of a relational database management system.

20. A non-transitory computer readable storage medium having stored thereon computer executable instructions that when executed on a computing device cause the computing device to perform a method of proactively managing fertiliser and irrigation inputs for a crop, the method comprising:
    obtaining management data for the crop, the management data including a planting date for the crop;
    obtaining weather data representative of the geographic area of the crop;
        obtaining soil description data representative of the geographic area of the crop;
        calculating an emergence date at least partly from the planting date;
        calculating a plurality of predicted nitrogen deficit values at least partly from the emergence date and the soil description data, the nitrogen deficit values associated with respective dates each later than the emergence date;
        calculating a plurality of predicted water deficit values at least partly from the emergence date and the weather data, the water deficit values associated with respective dates each later than the emergence date; and
        providing a proactive schedule of recommended nitrogen application values, irrigation values and application dates for future treatment, the schedule calculated at least partly from the predicted nitrogen deficit values and the predicted water deficit values.

21. A method of proactively predicting potential yield for a crop, the method comprising:
    obtaining management data for the crop, the management data including a planting date for the crop;
    obtaining weather data representative of the geographic area of the crop;
    obtaining soil description data representative of the geographic area of the crop;
    storing the management, weather and soil data as a data structure on at least one non-transitory computer readable storage medium;
    calculating an emergence date at least partly from the planting date;
        calculating a plurality of predicted nitrogen deficit values at least partly from the emergence date and the soil description data, the nitrogen deficit values associated with respective dates each later than the emergence date;
        calculating a plurality of predicted water deficit values at least partly from the emergence date and the weather data, the water deficit values associated with respective dates each later than the emergence date; and
        providing a proactive schedule of potential crop yield values for future treatment, the schedule calculated at least partly from the predicted nitrogen deficit values and the predicted water deficit values.

22. The method of claim 21 wherein the weather data includes at least one of solar radiation, maximum temperatures, minimum temperatures and precipitation.

23. The method of claim 21 wherein the weather data includes wind run.

24. The method of claim 21 wherein the weather data includes humidity.

25. The method of claim 21 wherein the weather data includes potential evapotranspiration.

26. The method of claim 21 wherein the weather data comprises a plurality of daily values.

27. The method of claim 21 wherein the soil description data includes at least one of soil texture profiles, soil bulk density profiles, soil hydraulic properties by depth, soil organic N content, mineralization coefficient, soil mineral N, and distribution of N within the first meter of soil.

28. The method of claim 21 wherein the emergence date is calculated at least partly from a user input emergence date.

29. The method of claim 21 wherein the management data includes cultivar type.

30. The method of claim 29 wherein the emergence date is calculated at least partly from cultivar type.

31. The method of claim 21 wherein the management data includes nitrogen management constraints.

32. The method of claim 21 wherein the management data includes water management constraints.

33. The method of claim 21 wherein the management data includes actual management to date.

34. The method of claim 21 wherein the emergence date is calculated at least partly from the soil description data.

35. The method of claim 21 further comprising calculating a growth commencement date.

36. The method of claim 21 further comprising calculating a maximum GAI date.

37. The method of claim 21 further comprising calculating a canopy senescence completion date.

38. The method of proactively managing fertilizer and irrigation inputs for a crop of claim 21, wherein the at least one non-transitory computer readable storage medium is in communication with a server.

39. The method of claim 38, wherein the at least one non-transitory computer readable storage medium is part of a relational database management system.

40. A non-transitory computer readable storage medium having stored thereon computer executable instructions that when executed on a computing device cause the computing device to perform a method of proactively predicting potential yield for a crop, the method comprising:
  obtaining management data for the crop, the management data including a planting date for the crop;
  obtaining weather data representative of the geographic area of the crop;
  obtaining soil description data representative of the geographic area of the crop;
  calculating an emergence date at least partly from the planting date;
  calculating a plurality of predicted nitrogen deficit values at least partly from the emergence date and the soil description data, the nitrogen deficit values associated with respective dates each later than the emergence date;
  calculating a plurality of predicted water deficit values at least partly from the emergence date and the weather data, the water deficit values associated with respective dates each later than the emergence date; and
  providing a proactive schedule of potential crop yield values for future treatment, the schedule calculated at least partly from the predicted nitrogen deficit values and the predicted water deficit values.

41. A method of proactively predicting potential drainage and leaching from crop production, the method comprising:
  obtaining management data for the crop, the management data including a planting date for the crop;
  obtaining weather data representative of the geographic area of the crop;
  obtaining soil description data representative of the geographic area of the crop;
  storing the management, weather and soil data as a data structure on at least one non-transitory computer readable storage medium;
  calculating an emergence date at least partly from the planting date;
  calculating a plurality of predicted nitrogen balance values at least partly from the emergence date and the soil description data, the nitrogen balance values associated with respective dates each later than the emergence date;
  calculating a plurality of predicted water balance values at least partly from the emergence date and the weather data, the water balance values associated with respective dates each later than the emergence date; and
  providing a proactive schedule of potential drainage and leaching values for future treatment, the schedule calculated at least partly from the predicted nitrogen balance values and the predicted water balance values.

42. The method of claim 41 wherein the weather data includes at least one of solar radiation, maximum temperatures, minimum temperatures and precipitation.

43. The method of claim 41 wherein the weather data includes wind run.

44. The method of claim 41 wherein the weather data includes humidity.

45. The method of claim 41 wherein the weather data includes potential evapotranspiration.

46. The method of claim 41 wherein the weather data comprises a plurality of daily values.

47. The method of claim 41 wherein the soil description data includes at least one of soil texture profiles, soil bulk density profiles, soil hydraulic properties by depth, soil organic N content, mineralization coefficient, soil mineral N, and distribution of N within the first meter of soil.

48. The method of claim 41 wherein the emergence date is calculated at least partly from a user input emergence date.

49. The method of claim 41 wherein the management data includes cultivar type.

50. The method of claim 49 wherein the emergence date is calculated at least partly from cultivar type.

51. The method of claim 41 wherein the management data includes nitrogen management constraints.

52. The method of claim 41 wherein the management data includes water management constraints.

53. The method of claim 41 wherein the management data includes actual management to date.

54. The method of claim 41 wherein the emergence date is calculated at least partly from the soil description data.

55. The method of claim 41 further comprising calculating a growth commencement date.

56. The method of claim 41 further comprising calculating a maximum GAI date.

57. The method of claim 41 further comprising calculating a canopy senescence completion date.

58. The method of proactively managing fertilizer and irrigation inputs for a crop of claim 41, wherein the at least one non-transitory computer readable storage medium is in communication with a server.

59. The method of claim 58, wherein the at least one non-transitory computer readable storage medium is part of a relational database management system.

60. A non-transitory computer readable storage medium having stored thereon computer executable instructions that when executed on a computing device cause the computing device to perform a proactive method of predicting potential drainage and leaching from crop production, the method comprising:

obtaining management data for the crop, the management data including a planting date for the crop;

obtaining weather data representative of the geographic area of the crop;

obtaining soil description data representative of the geographic area of the crop;

calculating an emergence date at least partly from the planting date;

calculating a plurality of predicted nitrogen balance values at least partly from the emergence date and the soil description data, the nitrogen balance values associated with respective dates each later than the emergence date;

calculating a plurality of predicted water balance values at least partly from the emergence date and the weather data, the water balance values associated with respective dates each later than the emergence date; and providing a proactive schedule of potential drainage and leaching values for future treatment, the schedule calculated at least partly from the predicted nitrogen balance values and the predicted water balance values.

61. A method for proactively managing fertiliser and irrigation inputs based on predictions for future crop requirements, the method comprising:

using a first computer for inputting management, weather and soil information, where said information includes:

management data for the crop, the management data including a planting date for the crop;

weather data representative of the geographic area of the crop; and soil description data representative of the geographic area of the crop;

sending the obtained management data, weather data and soil description data to a second computer for processing the data;

receiving at the first computer processed data comprising a schedule of proactive recommended nitrogen application values, irrigation values and application dates to establish future fertiliser and irrigation treatment of the crop, the schedule based on predictions for future crop requirements determined at least partly from:

a calculated emergence date at least partly from the planting date;

calculated predicted nitrogen deficit values at least partly from the emergence date and the soil description data, the nitrogen deficit values associated with respective dates each later than the emergence date; and calculated predicted water deficit values at least partly from the emergence date and the weather data, the water deficit values associated with respective dates each later than the emergence date.

62. The method of claim 61, wherein the first computer sends the information to the second computer via a web server.

63. The method of claim 61, wherein the weather data includes future mean or forecast data.

64. The method of claim 61, wherein the weather data includes temperature, rainfall and potential evapotranspiration.

\* \* \* \* \*